United States Patent
Haga et al.

(10) Patent No.: US 8,732,445 B2
(45) Date of Patent: May 20, 2014

(54) INFORMATION PROCESSING DEVICE, INFORMATION PROCESSING METHOD, INFORMATION PROCESSING PROGRAM, AND INTEGRATED CIRCUIT

(75) Inventors: Tomoyuki Haga, Nara (JP); Kenneth Alexander Nicolson, Hyogo (JP); Hideki Matsushima, Osaka (JP); Takayuki Ito, Osaka (JP); Hisashi Takayama, Osaka (JP)

(73) Assignee: Panasonic Corporation, Osaka (JP)

( * ) Notice: Subject to any disclaimer, the term of this patent is extended or adjusted under 35 U.S.C. 154(b) by 597 days.

(21) Appl. No.: 13/121,770

(22) PCT Filed: Oct. 9, 2009

(86) PCT No.: PCT/JP2009/005274
§ 371 (c)(1),
(2), (4) Date: Mar. 30, 2011

(87) PCT Pub. No.: WO2010/041462
PCT Pub. Date: Apr. 15, 2010

(65) Prior Publication Data
US 2011/0185165 A1    Jul. 28, 2011

(30) Foreign Application Priority Data
Oct. 10, 2008  (JP) .................................. 2008-263679

(51) Int. Cl.
*G06F 9/24* (2006.01)
*G06F 15/177* (2006.01)

(52) U.S. Cl.
USPC .................... 713/2; 713/1; 713/100; 380/249

(58) Field of Classification Search
CPC ....... G06F 12/145; G06F 21/12; G06F 21/54; G06F 21/57; G06F 21/72
USPC ................................. 713/1, 2, 100; 380/249
See application file for complete search history.

(56) References Cited

U.S. PATENT DOCUMENTS

| | | |
|---|---|---|
| 7,725,703 B2 | 5/2010 | Hunter et al. |
| 2006/0155988 A1 | 7/2006 | Hunter et al. |

(Continued)

FOREIGN PATENT DOCUMENTS

| | | |
|---|---|---|
| JP | 2006-323814 | 11/2006 |
| JP | 2008-535049 | 8/2008 |

(Continued)

OTHER PUBLICATIONS

International Search Report issued Nov. 2, 2009 in International (PCT) Application No. PCT/JP2009/005274.

(Continued)

*Primary Examiner* — Kim Huynh
*Assistant Examiner* — Michael J Brown
(74) *Attorney, Agent, or Firm* — Wenderoth, Lind & Ponack, L.L.P.

(57) ABSTRACT

An information processing terminal includes first sealed data respectively having usability conditions of matching with predetermined terminal environment information during a secure boot and second sealed data respectively having usability conditions of matching with terminal environment information upon completion of the secure boot. Upon completion of the secure boot, the second sealed data is unsealed and the first sealed data is resealed using the unsealed data. It is possible to update and re-seal sealed data having a usability condition of matching with predetermined terminal environment information during a secure boot without rebooting a terminal when a program using the sealed data is updated.

10 Claims, 27 Drawing Sheets

(56) References Cited

U.S. PATENT DOCUMENTS

2006/0161784 A1 7/2006 Hunter et al.
2008/0282348 A1 11/2008 Proudler et al.
2010/0011225 A1 1/2010 Takayama

FOREIGN PATENT DOCUMENTS

WO 2007/124091 11/2007
WO 2008/081801 7/2008

OTHER PUBLICATIONS

TPM Main Part 1 Design Principles, Specification Version 1.2 Level 2 Revision 103, published Jul. 9, 2007.
TPM Main Part 2 TPM Structures, Specification Version 1.2 Level 2 Revision 103, published Jul. 9, 2007.
TPM Main Part 3 Commands, Specification Version 1.2, Level 2 Revision 103, published Jul. 9, 2007.
TCG Mobile Trusted Module Specification, Version 1.0, Revision 1, Jun. 12, 2007.
TCG Mobile Reference Architecture Specification, Version 1.0 Revision 1, Jun. 12, 2007.

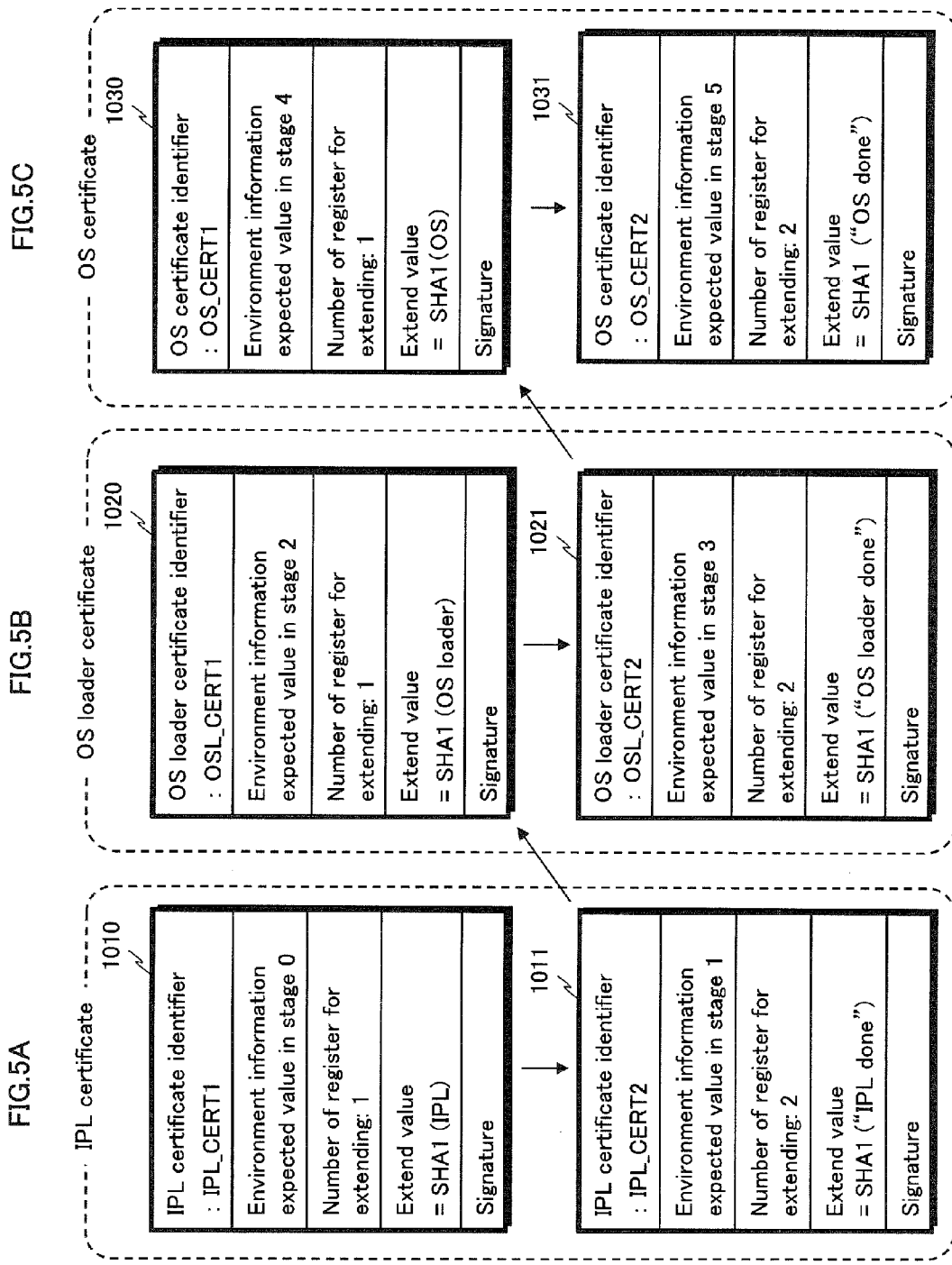

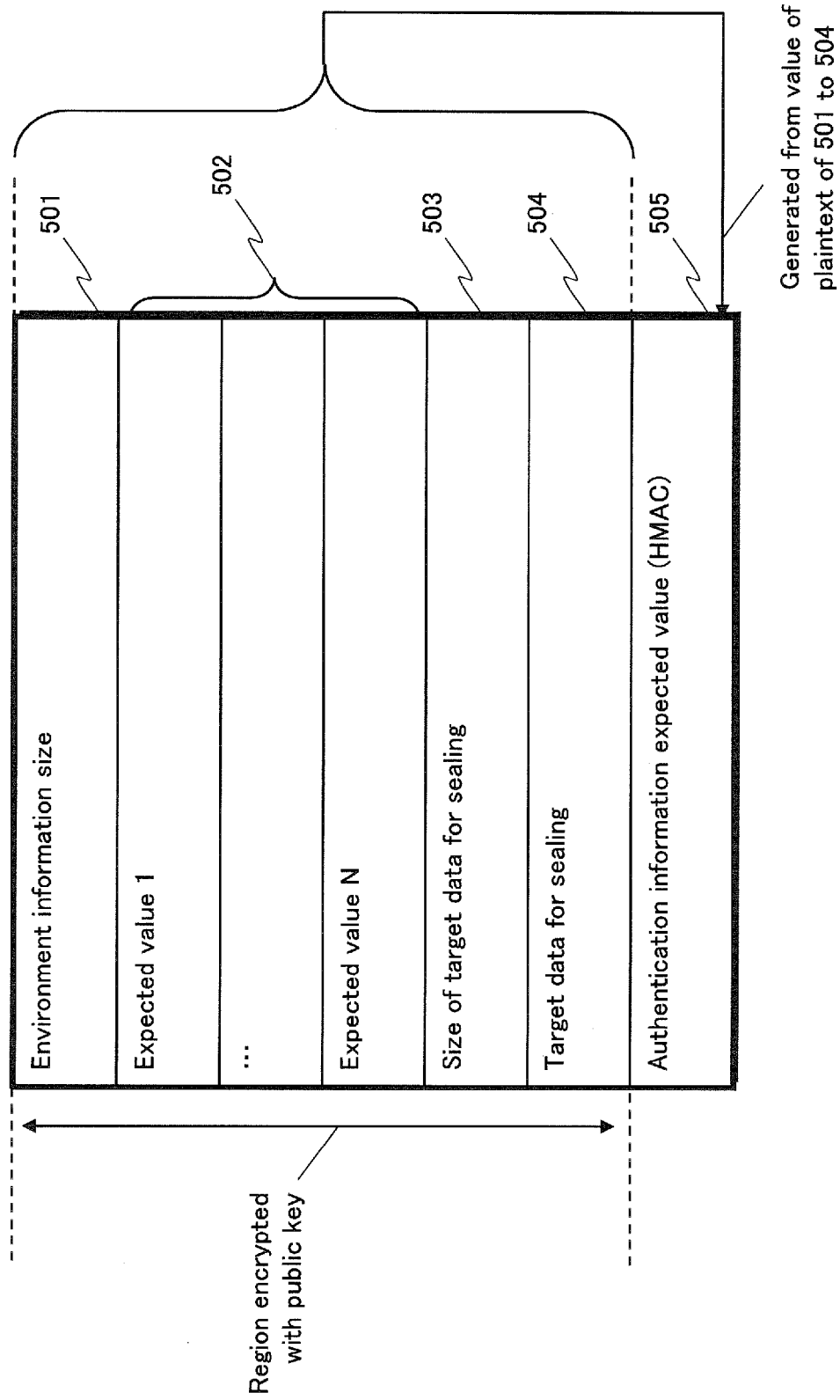

FIG.9

| Sealed data identifying information 1601 | Certificate identifying information 1602 |
|---|---|
| Sealed data for regular use 1 identifying information | IPL_CERT1 |
| Sealed data for regular use 2 identifying information | OSL_CERT1 |
| Sealed data for regular use 3 identifying information | OS_CERT1 |

1600

INFORMATION PROCESSING DEVICE, INFORMATION PROCESSING METHOD, INFORMATION PROCESSING PROGRAM, AND INTEGRATED CIRCUIT

BACKGROUND OF INVENTION

1. Technical Field

The present invention relates to information processing devices for securely booting stored programs, and more particularly to technology for maintaining a secure state even when a program requires updating.

2. Background Art

In recent years, terminal devices such as cellular phones have started to perform a secure boot to ensure a secure platform. After the terminal device has started to boot up, a hash value is calculated for each program, such as the OS, applications, etc., upon booting of the program. Integrity of the device is verified based on whether the calculated values, or a cumulative value thereof, is the expected value (see Non-Patent Literature 1-5). In the context of such a secure boot, a specific program that is being booted may use specific data. One such case is when program B in a terminal device is encrypted, and after program A (the specific program) boots, a decryption key (the specific data) is used to decrypt program B. Program B then boots. In this case, it is necessary to restrict the decryption key so that it can only be used by program A, and only when the platform is secure immediately before program A boots.

Patent Literature 1 discloses one form of technology for a specific program to securely handle specific data during a secure boot, namely to protect secure data as "sealed data" by using the seal function of the Trusted Platform Module (TPM) detailed by the Trusted Computing Group (TCG) and securely use the data during a secure boot by unsealing the sealed data in accordance with a condition for unsealing. In Patent Literature 1, a terminal device performs the seal function by protecting (hereinafter, "sealing") target data via encryption with the public key of a key pair in a public key encryption system, the public key being managed in the TPM. In this case, the target data for protection is the decryption key for decrypting an encrypted program B, and the condition for unsealing is that the hash value of program A be the expected values that should be stored in extended Platform Configuration Registers (PCRs). Hereinafter, these expected values are referred to as PCR expected values. The terminal device unseals the sealed data by issuing a decryption request for the sealed data and then outputting, within the TPM, decrypted plaintext of the target data for protection only when the PCR value stored in the TPM at the time of decryption matches the PCR expected value set as the condition for unsealing. In this way, through use of the condition for unsealing, acquisition of plaintext data of protected data is limited to when a predetermined program has properly booted. Conversely, when the terminal device is in an improper state, such as when the program has been tampered with, plaintext data cannot be extracted from the target data for protection in the sealed data, and the secure boot fails.

CITATION LIST

Patent Literature

Patent Literature 1: Japanese Patent Application Publication No. 2006-323814

Non-Patent Literature

Non-Patent Literature 1: TPM Main, Part 1 Design Principles, Specification Version 1.2, Level 2, Revision 103 (9 Jul. 2007)

Non-Patent Literature 2: TPM Main, Part 2 TPM Structures, Specification Version 1.2, Level 2, Revision 103 (9 Jul. 2007)

Non-Patent Literature 3: TPM Main, Part 3 Commands, Specification Version 1.2, Level 2, Revision 103 (9 Jul. 2007)

Non-Patent Literature 4: TCG Mobile Trusted Module Specification Version 1.0, Revision 1(12 Jun. 2007)

Non-Patent Literature 5: TCG Mobile Reference Architecture Specification Version 1.0, Revision 1 (12 Jun. 2007)

SUMMARY OF INVENTION

As described above, the technology in Patent Literature 1 limits acquisition of plaintext data of protected data to when a predetermined program has properly booted. However, this technology has the following problem. If program A is updated, the hash value of program A also changes. As a result, sealed data that uses the hash value of program A before updating in an extended PCR as the condition for unsealing cannot be decrypted. To enable decryption of sealed data, the terminal device has to be rebooted. During rebooting, the PCR value that matches the condition for unsealing before updating has to be acquired, the data has to be unsealed with this PCR value, and the data then has to be resealed using the updated PCR expected value. In other words, the problem exists that if program A is updated, it is absolutely necessary to reboot the terminal device.

Solution to Problem

In order to solve the above problems, an aspect of the present invention is an information processing device for performing a secure boot by booting a plurality of programs in a predetermined order while verifying integrity of each program, the information processing device comprising: an execution unit operable to execute the programs; an accumulation unit operable to generate, each time a program is booted, characteristic information on the program that has been booted, to accumulate the characteristic information as a cumulative value, and to store the cumulative value; a storage unit for storing first protected data and second protected data, the first protected data including boot data that is used by a specific program during booting and an expected value of the cumulative value stored by the accumulation unit immediately before the specific program is booted, and the second protected data including the boot data and an expected value of the cumulative value stored by the accumulation unit after the secure boot; a protection removal unit operable, upon updating, after the secure boot, of a program that is booted before the specific program, to remove protection from the second protected data, to determine whether the expected value in the second protected data matches the cumulative value stored by the accumulation unit after the secure boot, and to output the boot data only when the expected value and the cumulative value match; and a reprotection unit operable, when the protection removal unit outputs the boot data, to reprotect the first protected data so as to include the boot data and an expected value of the cumulative value stored by the accumulation unit immediately before the specific program is booted after the updating.

With the above structure for the information processing device according to the aspect of the present invention, the protection removal unit removes protection from the second protected data after the secure boot and outputs the boot data even when a program using the protected data is updated after the secure boot is complete, since the condition for output of the boot data in the second protected data by the protection removal unit is that the cumulative value after the secure boot and the expected value match. Therefore, the information processing device updates and reprotects boot data without the need to reboot.

BRIEF DESCRIPTION OF DRAWINGS

FIGS. 5A-5C show examples of program certificates in Embodiment 1 of the present invention.

FIG. 6 shows a data structure of sealed data in Embodiment 1 of the present invention.

FIGS. 7A and 7B show examples of sealed data in Embodiment 1 of the present invention, wherein FIG. 7A is an example of sealed data for regular use, and FIG. 7B is an example of sealed data for use when updating.

FIG. 9 shows a sealed data dependency list in Embodiment 1 of the present invention.

DETAILED DESCRIPTION OF INVENTION

Figure 1:
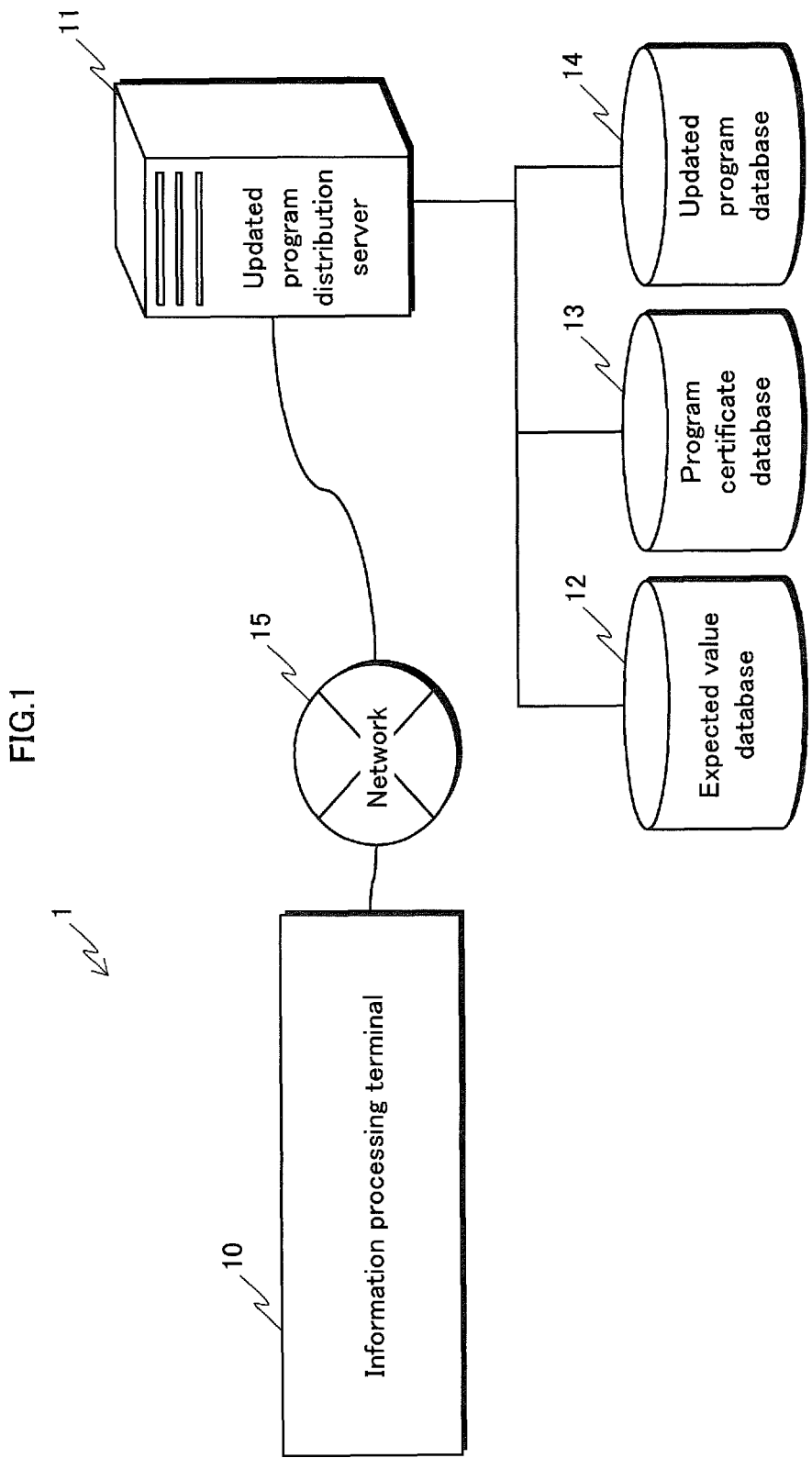
FIG. 1 shows an outline of a structure of an information processing system 1 in Embodiment 1 of the present invention.

An aspect of the present invention is an information processing device for performing a secure boot by booting a plurality of programs in a predetermined order while verifying integrity of each program, the information processing device comprising: an execution unit operable to execute the programs; an accumulation unit operable to generate, each time a program is booted, characteristic information on the program that has been booted, to accumulate the characteristic information as a cumulative value, and to store the cumulative value; a storage unit for storing first protected data and second protected data, the first protected data including boot data that is used by a specific program during booting and an expected value of the cumulative value stored by the accumulation unit immediately before the specific program is booted, and the second protected data including the boot data and an expected value of the cumulative value stored by the accumulation unit after the secure boot; a protection removal unit operable, upon updating, after the secure boot, of a program that is booted before the specific program, to remove protection from the second protected data, to determine whether the expected value in the second protected data matches the cumulative value stored by the accumulation unit after the secure boot, and to output the boot data only when the expected value and the cumulative value match; and a reprotection unit operable, when the protection removal unit outputs the boot data, to reprotect the first protected data so as to include the boot data and an expected value of the cumulative value stored by the accumulation unit immediately before the specific program is booted after the updating.

The reprotection unit may be further operable, when the protection removal unit outputs the boot data, to reprotect the second protected data to include the boot data and an expected value of the post-updating cumulative value stored by the accumulation unit after the updating and after the secure boot.

With the above structure, the information processing device reprotects the second protected data without rebooting, even when the specific program is updated after the secure boot is complete.

The protection removal unit may be further operable, when the execution unit issues a request to acquire the boot data during execution of the specific program, to remove protection from the first protected data, to determine whether the expected value in the first protected data matches the cumulative value stored by the accumulation unit, and to output the boot data to the execution unit only when the expected value and the cumulative value match.

With the above structure, only the specific program is permitted to use the boot data while maintaining the integrity of the device as a whole before booting of the specific program.

The reprotection unit may be further operable, when the boot data is changed by the execution unit during execution of the specific program, to generate new first protected data so as to include the changed boot data and an expected value of the cumulative value stored by the accumulation unit immediately before the specific program is booted, to replace the first protected data stored in the storage unit with the new first protected data, to generate new second protected data so as to include the changed boot data and an expected value of the cumulative value stored by the accumulation unit after the secure boot, and to replace the second protected data stored in the storage unit with the new second protected data.

With the above structure, even when the boot data changes due to execution of the specific program, and even when the specific program is updated after the secure boot is complete, the information processing device reprotects the changed boot data without rebooting.

The protection removal unit may be further operable to receive an instruction for protection removal, to remove protection from the first protected data, to determine whether the expected value in the first protected data matches the cumulative value stored by the accumulation unit, and to output the boot data only when the expected value and the cumulative value match. The information processing device may further comprise: a management information generation unit operable, each time a program is booted, to output the instruction for protection removal to the protection removal unit, and when the protection removal unit outputs the boot data, to generate management information designating the program that has been booted as the specific program and associating the specific program with the first protected data; and a management information storage unit for storing the management information, and each time a program is booted after the management information unit has stored the management information, the execution unit may determine whether the program that has been booted is the specific program in accordance with the management information.

With the above structure, each time a program is booted, the information processing device confirms whether the first protected data can be decrypted using the characteristic information for the program that has been booted. If the first protected data can be decrypted, the information processing device designates the next program that boots as the specific program and generates management information associating the specific program with the first protected data. Accordingly, the information processing device can determine which piece of first protected data corresponds to which program without having to continually verify the first protected data.

The first protected data and the second protected data may be protected by encryption, the protection removal unit may decrypt the second protected data to remove protection from the second protected data, and the reprotection unit may reprotect the first protected data by encrypting the boot data and an expected value of the cumulative value stored by the accumulation unit immediately before the specific program is booted after the updating.

With the above structure, the boot data is protected by encryption, which both prevents a program other than the specific program from using the boot data and restricts use of the boot data by the specific program to when the integrity of each program that boots before the specific program is maintained.

The characteristic information may be a hash value of the program that is booted.

With the above structure, the characteristic information is a hash value of the program that is booted. Therefore, if the program has been tampered with, the characteristic information no longer matches the expected value. In such a case, the protection removal unit does not output the boot data. Accordingly, boot data is prevented from being used in an environment in which a program that has been tampered with operates.

The characteristic information may be state information indicating a state in which the program is booted normally.

The state information may be a hash value of a character sequence indicating that the program has booted.

With the above structure, the characteristic information indicates a state in which the program has booted normally and is, in particular, a hash value of a character sequence. The state information and the character sequence are pieces of information indicating that "the program has booted" and are unrelated to the content of the program. Therefore, even if the specific program is updated, the characteristic information itself does not change. Accordingly, even if the specific program is updated, it is not necessary to update boot data for programs booting after the specific program using new characteristic information. This reduces the frequency with which programs are updated.

The reprotection unit may be further operable to back up the first protected data in the storage unit before reprotection, yielding backup first protected data, and the information processing device may further comprise a rollback unit operable, when instructed to restore an updated program to a state before updating, to replace reprotected first protected data with the backup first protected data.

With the above structure, the data updating unit in the information processing device stores the first protected data before updating in the first data storage unit so that this data is not overwritten. Furthermore, the information processing device restores the updated software module to the software module before updating and designates the first protected data before updating as new first updated data. In this way, when it becomes necessary to restore a software module to a previous version, the stored first protected data that was not deleted is used, which eliminates the need to recreate the first protected data.

Another aspect of the present invention is an information processing method used in an information processing device for performing a secure boot by booting a plurality of programs in a predetermined order while verifying integrity of each program, the information processing device including: an execution unit operable to execute the programs; an accumulation unit operable to generate, each time a program is booted, characteristic information on the program that has been booted, to accumulate the characteristic information as a cumulative value, and to store the cumulative value; and a storage unit for storing first protected data and second protected data, the first protected data including boot data that is used by a specific program during booting and an expected value of the cumulative value stored by the accumulation unit immediately before the specific program is booted, and the second protected data including the boot data and an expected value of the cumulative value stored by the accumulation unit after the secure boot, the information processing method comprising the steps of: removing protection from the second protected data upon updating, after the secure boot, of a program that is booted before the specific program, determining whether the expected value in the second protected data matches the cumulative value stored by the accumulation unit after the secure boot, and outputting the boot data only when the expected value and the cumulative value match; and reprotecting, when the protection removal unit outputs the boot data, the first protected data so as to include the boot data and an expected value of the cumulative value stored by the accumulation unit immediately before the specific program is booted after the updating.

Another aspect of the present invention is an information processing program used in an information processing device for performing a secure boot by booting a plurality of programs in a predetermined order while verifying integrity of each program, the information processing device including: an execution unit operable to execute the programs; an accumulation unit operable to generate, each time a program is booted, characteristic information on the program that has been booted, to accumulate the characteristic information as a cumulative value, and to store the cumulative value; and a storage unit for storing first protected data and second protected data, the first protected data including boot data that is used by a specific program during booting and an expected value of the cumulative value stored by the accumulation unit immediately before the specific program is booted, and the second protected data including the boot data and an expected value of the cumulative value stored by the accumulation unit after the secure boot, the information processing program causing a computer to perform the steps of: removing protection from the second protected data upon updating, after the secure boot, of a program that is booted before the specific program, determining whether the expected value in the second protected data matches the cumulative value stored by the accumulation unit after the secure boot, and outputting the boot data only when the expected value and the cumulative value match; and reprotecting, when the protection removal unit outputs the boot data, the first protected data so as to include the boot data and an expected value of the cumulative value stored by the accumulation unit immediately before the specific program is booted after the updating.

Another aspect of the present invention is a computer readable recording medium storing thereon an information processing program used in an information processing device for performing a secure boot by booting a plurality of programs in a predetermined order while verifying integrity of each program, the information processing device including: an execution unit operable to execute the programs; an accumulation unit operable to generate, each time a program is booted, characteristic information on the program that has been booted, to accumulate the characteristic information as a cumulative value, and to store the cumulative value; and a storage unit for storing first protected data and second protected data, the first protected data including boot data that is used by a specific program during booting and an expected value of the cumulative value stored by the accumulation unit immediately before the specific program is booted, and the second protected data including the boot data and an expected value of the cumulative value stored by the accumulation unit after the secure boot, the information processing program causing a computer to perform the steps of: removing protection from the second protected data upon updating, after the secure boot, of a program that is booted before the specific program, determining whether the expected value in the second protected data matches the cumulative value stored by the accumulation unit after the secure boot, and outputting the boot data only when the expected value and the cumulative value match; and reprotecting, when the protection removal unit outputs the boot data, the first protected data so as to include the boot data and an expected value of the cumulative value stored by the accumulation unit immediately before the specific program is booted after the updating.

With the above structure, in the protection removal step, protection is removed from the second protected data after the secure boot, and boot data is output, since the condition for output of the boot data in the second protected data during the protection removal step is that the cumulative value after the secure boot and the expected value match. Therefore, the information processing device updates and reprotects boot data without the need to reboot.

Another aspect of the present invention is an integrated circuit used in an information processing device for performing a secure boot by booting a plurality of programs in a predetermined order while verifying integrity of each program, the information processing device comprising: an execution unit operable to execute the programs; an accumulation unit operable to generate, each time a program is booted, characteristic information on the program that has been booted, to accumulate the characteristic information as a cumulative value, and to store the cumulative value; a storage unit for storing first protected data and second protected data, the first protected data including boot data that is used by a specific program during booting and an expected value of the cumulative value stored by the accumulation unit immediately before the specific program is booted, and the second protected data including the boot data and an expected value of the cumulative value stored by the accumulation unit after the secure boot; a protection removal unit operable, upon updating, after the secure boot, of a program that is booted before the specific program, to remove protection from the second protected data, to determine whether the expected value in the second protected data matches the cumulative value stored by the accumulation unit after the secure boot, and to output the boot data only when the expected value and the cumulative value match; and a reprotection unit operable, when the protection removal unit outputs the boot data, to reprotect the first protected data so as to include the boot data and an expected value of the cumulative value stored by the accumulation unit immediately before the specific program is booted after the updating.

With the above structure, the protection removal unit removes protection from the second protected data after the secure boot and outputs the boot data even when a program using the protected data is updated after the secure boot is complete, since the condition for output of the boot data in the second protected data by the protection removal unit is that the cumulative value after the secure boot and the expected value match. Therefore, the information processing device updates and reprotects boot data without the need to reboot.

The following describes embodiments of the present invention with reference to the drawings.

1. Embodiment 1

1.1 System Outline

FIG. 1 shows an outline of a structure of an information processing system 1 according to Embodiment 1.

In the information processing system 1, an information processing terminal 10 and updated program distribution server 11 are connected through a network 15. In Embodiment 1, the information processing terminal 10 and the updated program distribution server 11 are specifically personal computers. The network 15 is specifically the Internet.

The information processing terminal 10 stores programs, specifically an Initial Program Loader (IPL) 101, OS loader 102, and OS 103, as well as a program certificate for each of these programs. When the power is turned, ON, the IPL 101, OS loader 102, and OS 103 are securely booted in this order. During the secure boot, each program is booted by verifying the integrity of the program, as well as the overall integrity of the information processing terminal 10, by using the corresponding program certificate. When integrity is maintained, the information processing terminal 10 cumulatively stores a hash value for the booted program in an environment information register within a provided secure module (this process hereinafter being referred to as an extend operation).

In this context, the IPL, OS loader, OS, etc. may be updated in order to fix problems such as bugs in the programming. The updated program distribution server 11 transmits an IPL, OS loader, OS, etc. for updating along with a program certificate corresponding to the updated program to the information processing terminal 10.

The updated program distribution server 11 includes an expected value database 12, certificate database 13, and updated program database 14.

Updated programs for the information processing terminal 10 are recorded in the updated program database 14. Program certificates that are distributed along with updated programs are recorded in the certificate database 13. The values in the environment information register and the expected hash values (expected values) when programs boot up during a secure boot are recorded in the expected value database 12. The updated program distribution server 11 requests that the information processing terminal 10 transmit the hash values (environment information) stored in the environment information register and receives, in response, the environment information transmitted by the information processing terminal 10. The updated program distribution server 11 compares the environment information with the expected values registered in the expected value database 12, and if the values are equal, determines the information processing terminal 10 to be a legitimate terminal. The updated program distribution server 11 only transmits updated programs, contents, etc. to terminals determined to be legitimate. This function corresponds to attestation in the TCG Next, a more specific description of a secure boot by the information processing terminal 10 is described with reference to FIG. 2.

Figure 2:
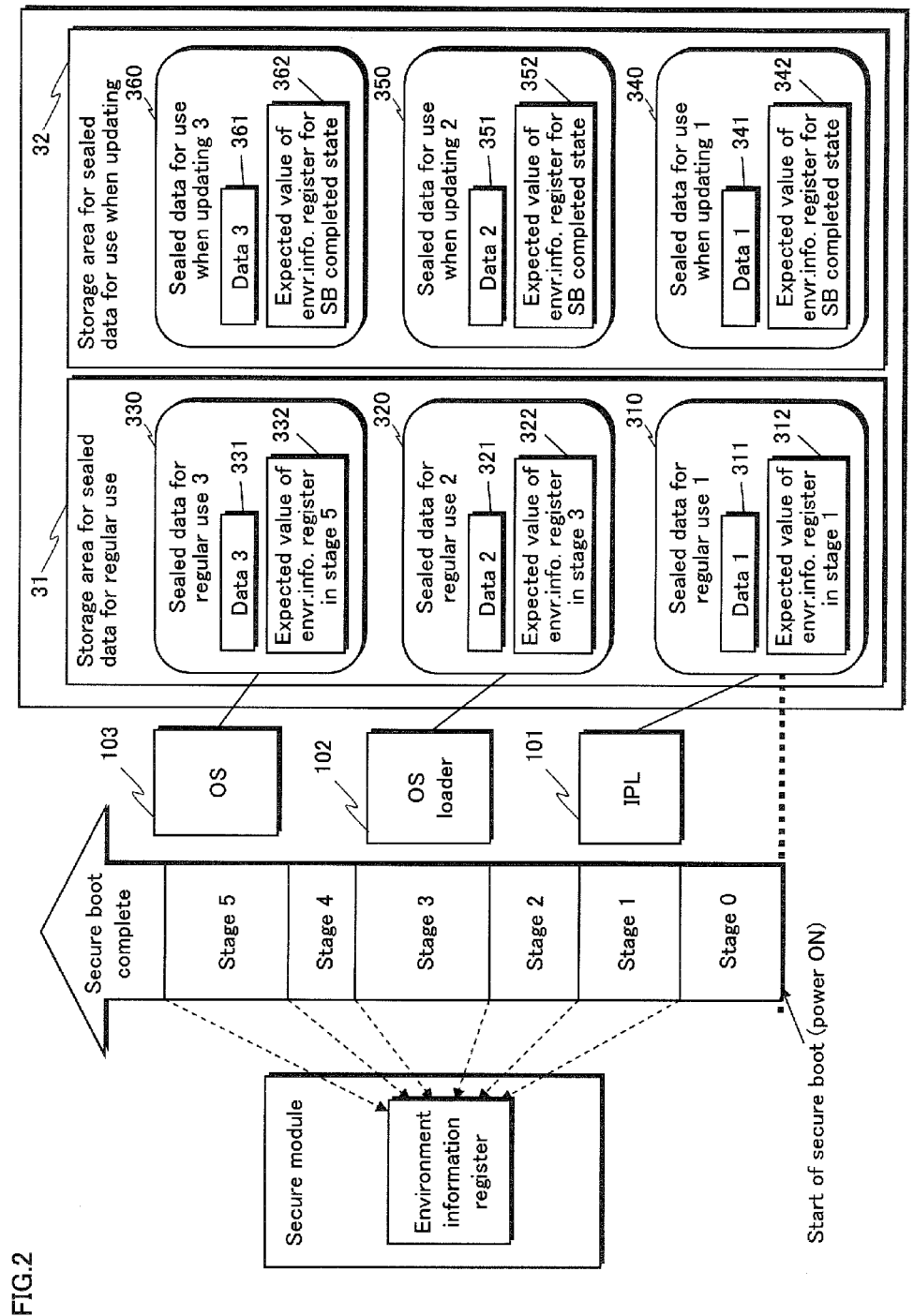
FIG. 2 illustrates a secure boot in Embodiment 1 of the present invention.

As shown in FIG. 2, the process of a secure boot in Embodiment 1 is divided into six stages (stages 0-5 in FIG. 2), each stage being the interval until a value in the environment information register is updated. The overall integrity of the information processing terminal 10 is verified in each stage.

In stages 0-2, the IPL 101 is booted. In stages 3 and 4, the OS loader 102 is booted, and in stage 5, the OS 103 is booted. During booting, the IPL 101, OS loader 102, and OS 103 decrypt (unseal) and use encrypted (sealed) data unique to each program. Specifically, the IPL 101 uses data 1 (311) during booting in stage 1. When booting in stage 1 is complete, the IPL 101 discards the data 1. The OS loader 102 uses data 2 (321) during booting in stage 3. When booting in stage 3 is complete, the OS loader 102 discards the data 2. The OS 103 uses data 3 (331) during booting in stage 5. When booting in stage 5 is complete, the OS 103 discards the data 3.

The data 1 is sealed data of two types: sealed data for regular use 310, and sealed data for use when updating 340.

The sealed data for regular use 310 includes the environment information register expected value 312 in stage 1 as the condition for unsealing.

The secure module is structured to output unsealed data when the value currently stored in the environment information register matches the value set as the condition for unsealing. Therefore, when the value stored in the environment information register matches the environment information register expected value 312 in stage 1 set as the condition for unsealing, the IPL 101 can acquire the unsealed unique data 1 (311).

The reason for storing two types of sealed data for the unique data is that, after the secure boot is complete, the value of the environment information register for the IPL 101 may be changed due to extending by the OS loader 102, OS 103, etc. which boot up after the IPL 101, thus making it impossible to obtain the value of the environment information register for the IPL 101. In this case, if only the sealed data for regular use 310 is stored, the sealed data used by the IPL cannot be unsealed. Therefore, along with the sealed data for regular use 1 (310), the information processing terminal 10 stores sealed data for use when updating 1 (340) corresponding to the sealed data for regular use 1. The sealed data for use when updating has the hash value after the secure boot set as the condition for unsealing. Other than the condition for unsealing, the sealed data for regular use and the sealed data for use when updating do not differ.

The value of the condition for unsealing set for the sealed data for use when updating can be acquired even after the secure boot is complete. Therefore, the information processing terminal 10 can unseal the sealed data that the IPL uses even after the secure boot is complete.

During the secure boot, the OS loader 102 uses sealed data for regular use 2 (320), which is data 2 (321) that has been sealed using the environment information register expected value 322 in stage 3 as the condition for unsealing. The OS 103 uses, during the secure boot, sealed data for regular use 3 (330), which is data 3 (331) that has been sealed using the environment information register expected value 332 in stage 5 as the condition for unsealing.

The information processing terminal 10 stores, for the OS loader 102, sealed data for regular use 320 and sealed data for use when updating 350, and stores, for the OS 103, sealed data for regular use 330 and sealed data for use when updating 360. The information processing terminal 10 performs the same processing for the OS loader 102 and the OS 103 as for the IPL 101.

Next, Embodiment 1 is described in greater detail.

1.2 Structure

Figure 3:
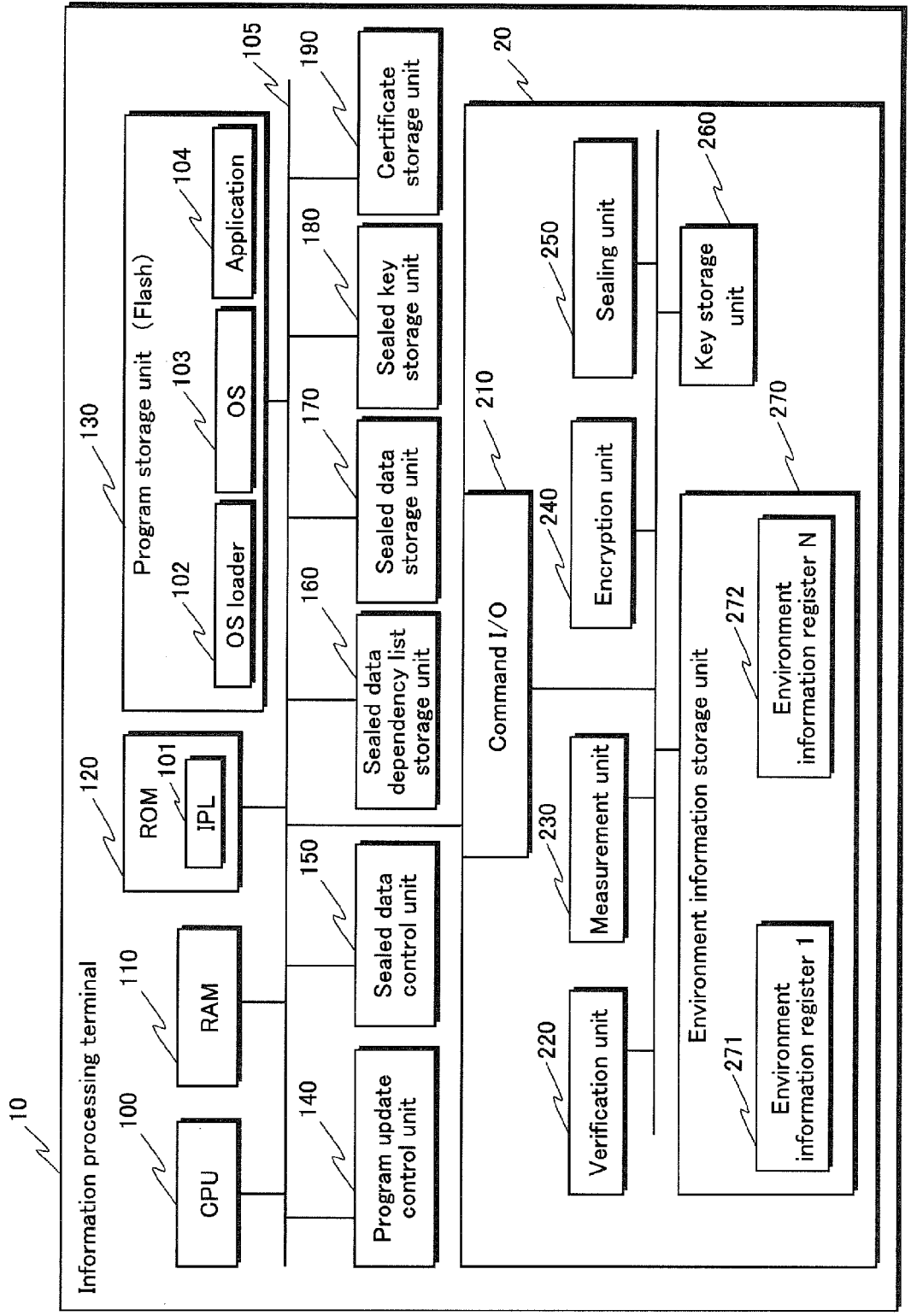
FIG. 3 shows a structure of an information processing terminal in Embodiment 1 of the present invention.

FIG. 3 is a block diagram showing the structure of the information processing terminal 10.

The information processing terminal 10 includes a Central Processing Unit (CPU) 100, Random Access Memory (RAM) 110, Read Only Memory (ROM) 120, program storage unit 130, program update control unit 140, sealed data control unit 150, sealed data dependency list storage unit 160, sealed data storage unit 170, sealed key storage unit 180, certificate storage unit 190, and secure module 20, as well as a bus 105 connecting the above components.

The ROM 120 stores the IPL 101.

The program storage unit 130 is a non-volatile memory such as Flash memory and stores programs such as the OS loader 102, OS 103, applications 104, etc.

The certificate storage unit 190 stores program certificates corresponding to programs such as the IPL 101, OS loader 102, OS 103, etc.

Figure 4:
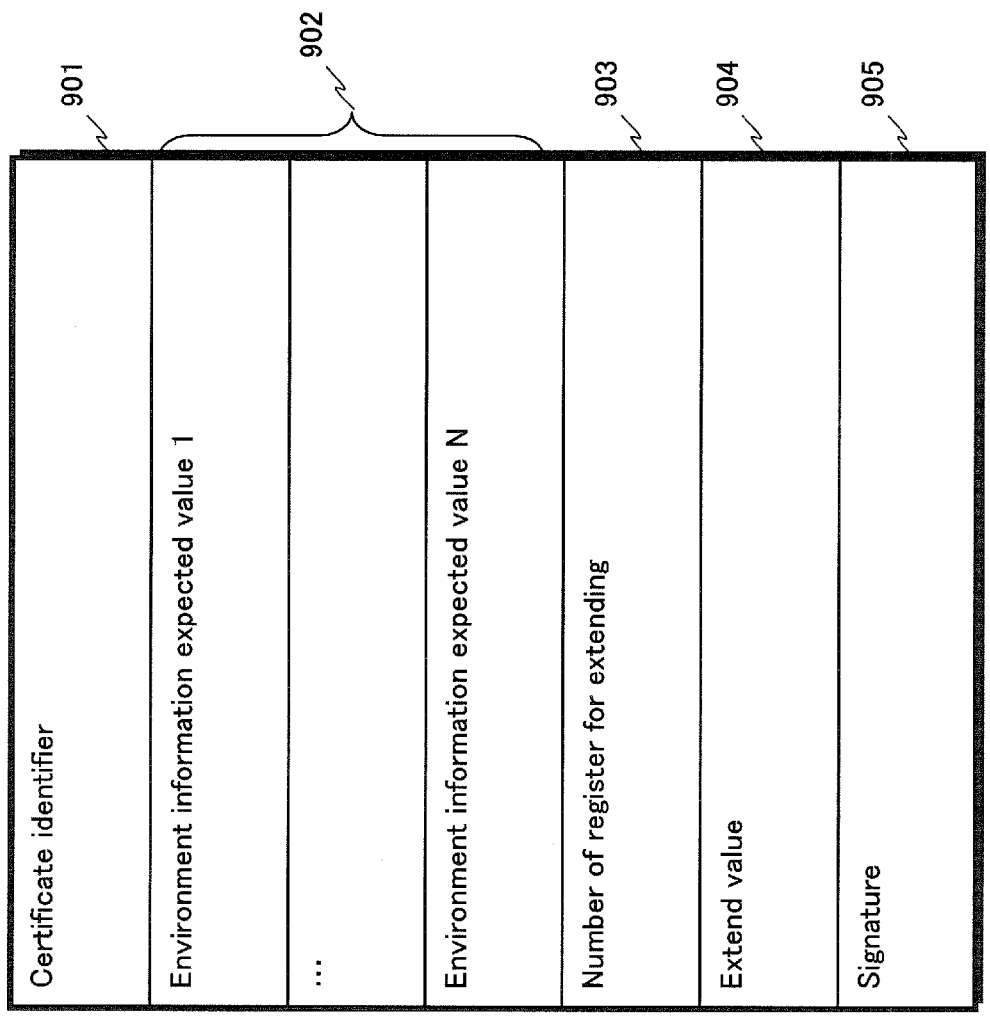
FIG. 4 shows a data structure of a program certificate in Embodiment 1 of the present invention.

FIG. 4 shows a data structure of a program certificate.

The program certificate includes a certificate identifier 901, environment information expected values 902, number of register for extending 903, extend value 904, and signature 905. The certificate identifier 901 is information for identifying the program corresponding to the program certificate. The environment information expected values 902 indicate values that should be recorded in environment information registers in the secure module 20 during a secure boot, immediately before the program boots. In Embodiment 1, the secure module has N environment information registers 1-N, described below in more detail. Accordingly, the environment information expected values 902 include environment information expected values 1-N in one-to-one correspondence with the environment information registers. The extend value 904 indicates a value to be extended into the environment information register 271 during the extend operation. The number of register for extending 903 indicates the environment information register into which the value recorded in the extend value 904 is to be extended. For example, if the value of the number of register for extending 903 is 1, the secure module extends the extend value 904 into environment information register 1 during the extend operation. The signature 905 is a digital signature for the certificate identifier 901, environment information expected values 902, number of register for extending 903, and extend value 904. The signature 905 may, for example, be generated using a private key in a public key cryptosystem, such as the RSA cryptosystem or elliptic curve cryptosystem.

FIGS. 5A-5C show examples of program certificates. FIG. 5A shows IPL certificates (1010, 1011), which are program certificates for the IPL 101. FIG. 5B shows OS loader certificates (1020, 1021), which are program certificates for the OS loader 102. FIG. 5C shows OS certificates (1030, 1031), which are program certificates for the OS 103. The arrows between program certificates in the figures indicate the order in which certificates are used during a secure boot. For example, focusing on the IPL certificates, the arrow pointing from the IPL certificate 1010 to the IPL certificate 1011 indicates that the latter is used after the former.

IPL_CERT1 is set as the certificate identifier for the IPL certificate 1010. The environment information expected value in stage 0 is set as the environment information expected value. The number of register for extending is set to 1. SHA1(IPL) is set as the extend value. In this context, "SHA1(XX)" indicates the SHA1 hash value of module XX. SHA1(IPL) thus indicates the SHA1 hash value of IPL 101. The signature is set to a digital signature for "IPL_CERT1", "environment information expected value in stage 0", "1", and "SHA1(IPL)". The IPL certificate 1011, OS loader certificates 1020 and 1021, and OS certificates 1030 and 1031 are the same as the IPL certificate 1010, and accordingly a description thereof is omitted.

The program update control unit 140 controls changes to programs recorded in the program storage unit 130.

The program update control unit 140 receives a program update request from the updated program distribution server 11. Next, the program update control unit 140 receives an updated program and a program certificate corresponding to the updated program from the updated program distribution server 11. The program update control unit 140 then stores the received updated program in the program storage unit 130 and the received program certificate in the certificate storage unit 190. After updating the program, the program update control unit 140 requests that the sealed data control unit 150 update sealed data.

The sealed data control unit 150 controls processing of sealed data. For example, the sealed data control unit 150 updates sealed data upon receiving a request to do so.

The sealed data storage unit 170 stores data that has been sealed (hereinafter, "sealed data"). The following describes sealed data in detail.

FIG. 6 shows a data structure of sealed data.

Sealed data includes expected values 1 through N (502), environment information size 501 indicating the size of the expected values 502, target data for sealing 504, a size of the target data for sealing 503, and an authentication information expected value 505. The expected values 502 indicate conditions for permitting use of unsealed data. Specifically, the expected values 502 are the expected values for values that should be stored in the environment information registers in order to permit use of unsealed data. For example, after unsealing sealed data, the secure module 20 permits use of the unsealed data by outputting the unsealed data to a destination outside the secure module 20 when the values stored in the environment information registers 1-N match the expected values 1-N (502). The authentication information expected value 505 is generated from the environment information size 501, expected values 502, size of the target data for sealing 503, and target data for sealing 504. The authentication information expected value 505 is the value of HMAC-SHA1. The value of the HMAC key used to calculate HMAC-SHA1 may be generated from a password input by a user, or may be a root key that is encrypted and stored in advance in the sealed key storage unit 180. The environment information size 501, expected values 502, size of the target data for sealing 503, and target data for sealing 504 are encrypted with the sealed data public key (411, 421, 431). Note that while not shown in FIG. 6, sealed data identifying information may be provided for identifying each piece of sealed data.

Figure 7A:
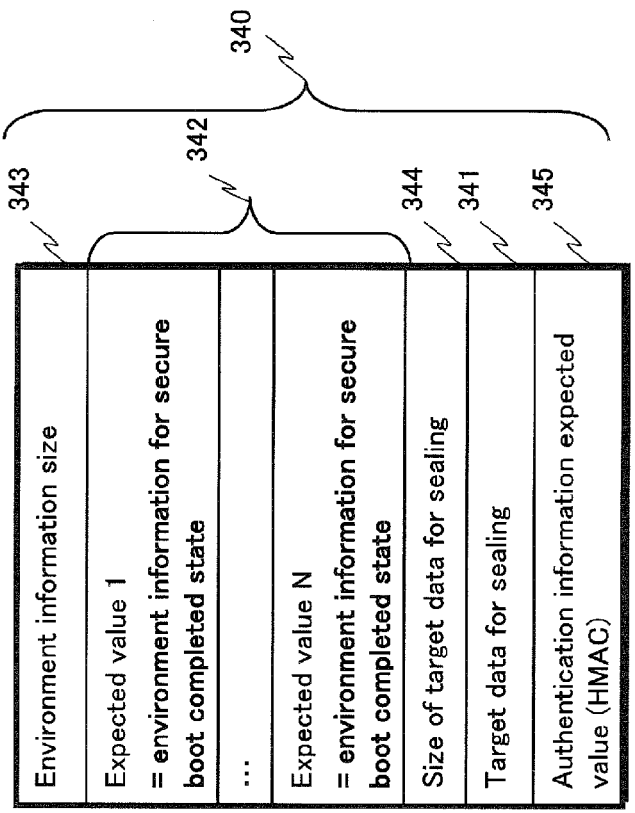
Figure 7B:
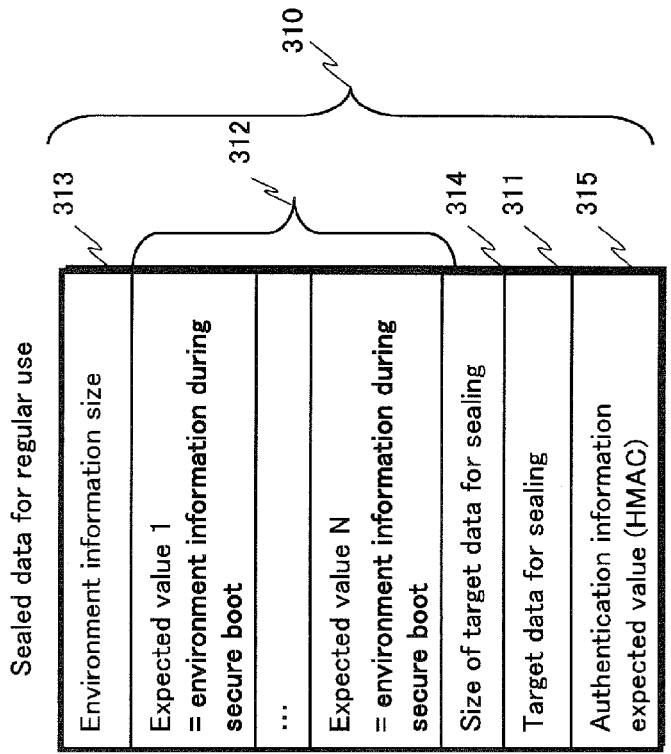

FIGS. 7A and 7B show examples of sealed data.

FIG. 7A shows sealed data for regular use 310, and FIG. 7B shows sealed data for use when updating 340. The difference between the sealed data for regular use 310 and the sealed data for use when updating 340 is the value stored in the environment information register expected value 312. The environment information register expected value 312 in the sealed data for regular use (corresponding to 502 in FIG. 6) is set to "the expected value that should be stored in the environment information register during a secure boot" as the condition for unsealing. On the other hand, the environment information register expected value 342 in the sealed data for use when updating (corresponding to 502 in FIG. 6) is set to "the expected value that should be stored in the environment information register after completion of a secure boot" as the condition for unsealing. The same data is stored in the target data for sealing 311 (corresponding to 504 in FIG. 6) in the sealed data for regular use 310 and in the target data for sealing 341 (corresponding to 504 in FIG. 6) in the sealed data for use when updating 340. The pieces of sealed data for regular use (320, 330) are similar to the sealed data for regular use 310, and the pieces of sealed data for use when updating (350, 360) are similar to the sealed data for use when updating 340. Therefore, details on these pieces of data are omitted.

The expected value 502 of the sealed data may store expected values for all registers, or only expected values for some registers.

Figure 8A:
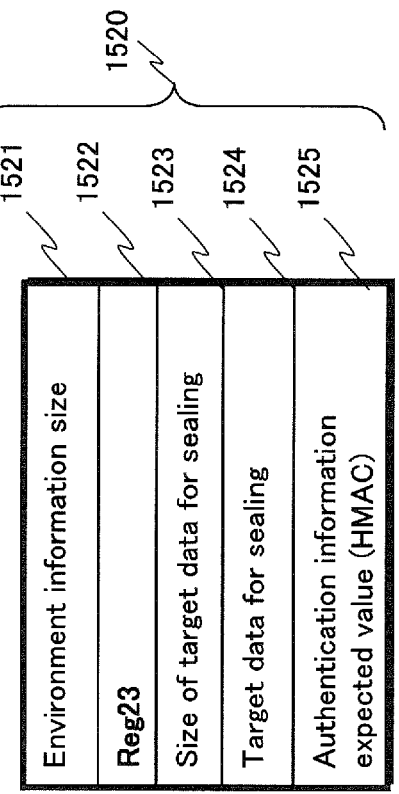
FIGS. 8A and 8B show examples of sealed data for use when updating having, as the condition for unsealing, the expected values for the secure boot completed state in Embodiment 1 of the present invention.
Figure 8B:
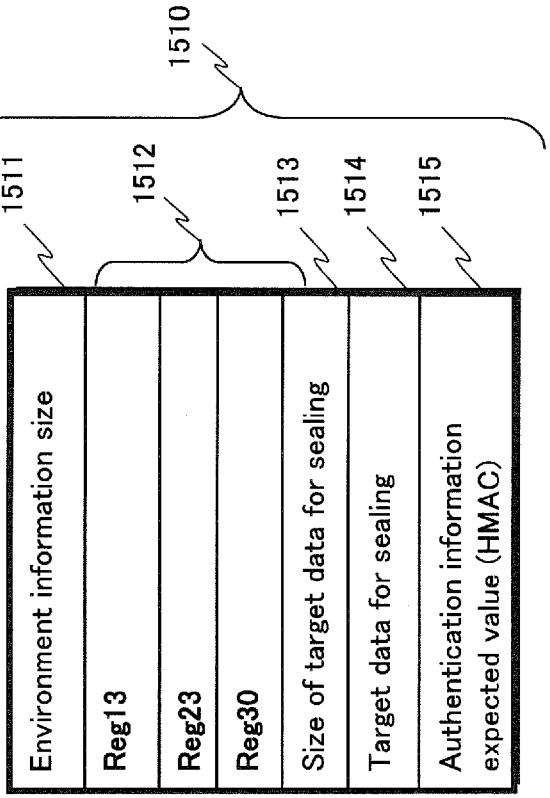

FIGS. 8A and 8B show examples of sealed data for use when updating having, as the condition for unsealing, expected values for the secure boot completed state 1300 in Embodiment 1 of the present invention.

FIG. 8A shows an example of sealed data for use when updating having, as the condition for unsealing, all of the registers in the expected values for the secure boot completed state 1300. Reg13, Reg23, and Reg30, which are expected values for the secure boot completed state, are set as the expected values 1512 (corresponding to 502 in FIG. 6) in the sealed data for use when updating 1510. FIG. 8B shows an example of sealed data for use when updating having, as the condition for unsealing, a portion of the registers in the expected values for the secure boot completed state 1300. Only the environment information register Reg22 is set as the expected value 1522 (corresponding to 502 in FIG. 6) in the sealed data for use when updating 1520. At least one register in the environment information register expected values 1300 after completion of a secure boot may thus be used as the condition for unsealing of the sealed data for use when updating. Unsealing is therefore possible in an environment in which a secure boot has been completed normally. Accordingly, use of data is limited to a proper execution environment, thus preventing malicious use of data by, for example, programs whose data has been tampered with.

The hash value of a program changes when the program is updated. Accordingly, all data having, as the condition for unsealing, the expected value of the hash value of a program that boots after an updated program needs to be resealed using the expected value of the new hash value. By contrast, if Reg23 in FIG. 8B is set, for example, to the hash value of a character sequence such as SHA1 ("OS done"), the extended value of the OS certificate 1031 in FIGS. 5A-5C, then even if the program is updated, the hash value of Reg23 need not be changed. Accordingly, it is not necessary to reseal the data with the new hash value. This greatly reduces the effort involved in updating a program.

The sealed data dependency list storage unit 160 stores a sealed data dependency list, which is information indicating the relationship between pieces of sealed data and certificates.

The sealed data dependency list is used to determine which piece of sealed data should be updated as a result of updating of a program that is the target of a secure boot.

FIG. 9 shows a sealed data dependency list 1600.

The sealed data dependency list 1600 includes sealed data identifying information 1601 and program certificate identifying information 1602. The sealed data identifying information 1601 is information to identify pieces of sealed data. In Embodiment 1, the sealed data identifying information 1601 uses the same information as the authentication information expected value 505 in the sealed data. The certificate identifying information 1602 is information for identifying program certificates. In Embodiment 1, the certificate identifier 901 listed in the program certificate is used as an example of certificate identifying information 1602. When a program that is the target of a secure boot is to be updated, it is accordingly necessary at the same time to update the program certificate corresponding to the program as well. Furthermore, it is also necessary at the same time to update certificates storing expected values that depend on the hash value of the program that is updated. In the example in FIGS. 5A-5C, if IPL 101 is updated, the value of SHA1(IPL), i.e. the hash value of the module IPL 101, changes. Therefore, it is necessary to update program certificates used after the secure boot in which IPL certificate 1011 is used, as well as to update certificates storing values that depend on the environment information expected value register 1 (1201) to the expected values 902. Accordingly, the updated program distribution server 11 distributes, at the same time as the updated program, program certificates that are required due to updating.

The following is a supplementary explanation of the relationship between a program that is updated in FIG. 9 and sealed data that is consequently updated.

When the IPL certificate 1010 is updated, the expected value (312) for stage 1 also needs to be updated. It follows that the sealed data for regular use 1 (310), which has the expected value (312) for stage 1 as the condition for unsealing, needs to be updated.

When the OS loader certificate 1020 is updated, the expected value (322) for stage 3 also needs to be updated. It follows that the sealed data for regular use 2 (320), which has the expected value (322) for stage 3 as the condition for unsealing, needs to be updated.

When the OS certificate 1030 is updated, the expected value (332) for stage also needs to be updated. It follows that the sealed data for regular use 3 (330), which has the expected value (332) for stage 5 as the condition for unsealing, needs to be updated.

This concludes the description of the sealed data dependency list.

The sealed key storage unit 180 stores keys used to encrypt sealed data.

Figure 10:
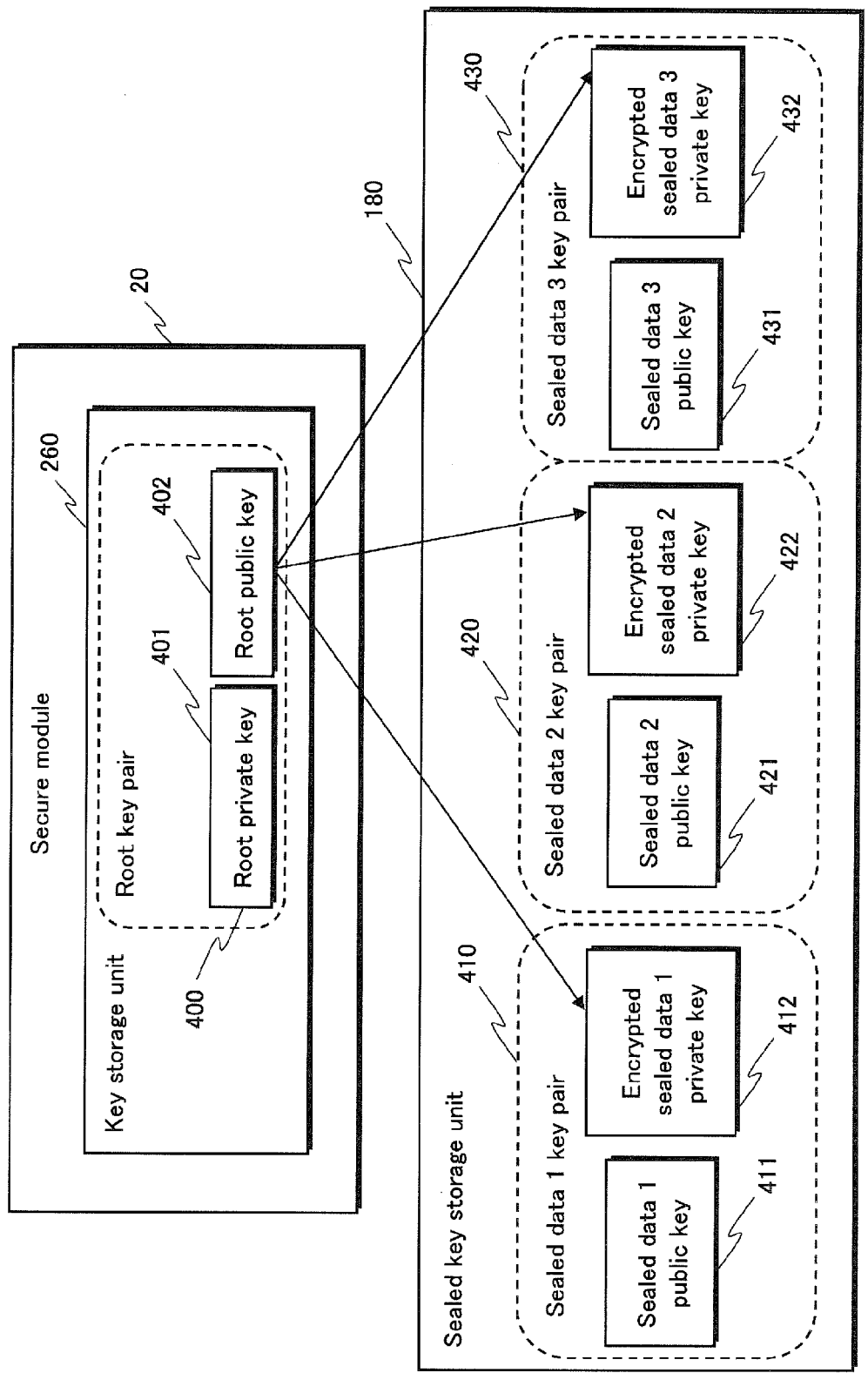
FIG. 10 shows a sealed data key pair in Embodiment 1 of the present invention.

FIG. 10 is a schematic diagram showing processing (sealing) to generate the sealed data for regular use and sealed data for use when updating in FIG. 2, as well as a sealed data key pair used for unsealing.

The key storage unit 260 in the secure module 20 stores a root key pair 400.

The root key pair 400 is composed of a root private key 401 and a root public key 402. In Embodiment 1, the root public key 402 is stored in the key storage unit 180, but in general public keys do not need to be concealed. Therefore, the root public key 402 may be stored in a sealed key storage unit 180 other than in the secure module 20.

The sealed key storage unit 180 stores keys used for sealing and unsealing of the sealed data for regular use (310, 320, 330) and the sealed data for use when updating (340, 350, 360) in the sealed data storage unit 170.

A sealed data 1 key pair (410) is a pair of keys used for generation and unsealing of the sealed data for regular use 1 (310) and the sealed data for use when updating 1 (340). The sealed data 1 key pair (410) is composed of a sealed data private key 411 and a sealed data public key 412. The sealed data public key 411 is used to generate the sealed data for regular use 1 (310) and the sealed data for use when updating 1 (340). The sealed data private key 412 is used to unseal the sealed data for regular use 1 (310) and the sealed data for use when updating 1 (340).

A sealed data 2 key pair (420) is a pair of keys used for generation and unsealing of the sealed data for regular use 2 (320) and the sealed data for use when updating 2 (350). The sealed data 2 key pair (420) is composed of a sealed data private key 421 and a sealed data public key 422. The sealed data public key 421 is used to generate the sealed data for regular use 2 (320) and the sealed data for use when updating 2 (350). The sealed data private key 422 is used to unseal the sealed data for regular use 2 (320) and the sealed data for use when updating 2 (350).

A sealed data 3 key pair (430) is a pair of keys used for generation and unsealing of the sealed data for regular use 3 (330) and the sealed data for use when updating 3 (360). The sealed data 3 key pair (430) is composed of a sealed data private key 431 and a sealed data public key 432. The sealed data public key 431 is used to generate the sealed data for regular use 3 (330) and the sealed data for use when updating 3 (360). The sealed data private key 432 is used to unseal the sealed data for regular use 3 (330) and the sealed data for use when updating 3 (360).

The sealed data private keys (412, 422, 432) are stored in the sealed key storage unit 180 after being encrypted with the root private key 402. During unsealing, it is requested that the encrypted sealed data private keys (412, 422, 432) in the secure module 20 be decrypted. Decrypted, plaintext sealed data private keys (412, 422, 432) are set in the key storage unit 170 in the secure module 20.

As the plaintext sealed data private keys are thus used in the secure module, the security of these private keys is increased. If the secure module 20 is provided with TPM functions, this structure may be implemented via the protected storage function of the TCG.

The secure module 20 is a module having tamper resistance and includes a command I/O (210), measurement unit 230, encryption unit 240, key storage unit 260, verification unit 220, environment information storage unit 270, and sealing unit 250.

The command I/O (210) receives commands from the secure module 20 and outputs command results to the secure module 20.

The measurement unit 230 performs a keyed hash calculation such as SHA1, SHA256, or HMAC-SHA1. The measurement unit 230 also performs extend operations.

The encryption unit 240 performs public key encryption as in the RSA cryptosystem or elliptic curve cryptosystem, or symmetric key encryption as in AES.

The key storage unit 260 stores keys used for encryption in the encryption unit 240 and keys used, for example, in keyed hash functions in the measurement unit 230.

The verification unit 220 uses the valued obtained by the measurement unit 230 to verify the integrity of data targeted for measurement.

The environment information storage unit 270 is provided with N environment information registers 1 (271)-N (272) storing environment information and thus stores environment information on booted programs. In Embodiment 1, N=3, and the environment information storage unit 270 is provided with an environment information register 1 (1201), environment information register 2 (1202), and environment information register 3 (1203).

The sealing unit 250 performs processing for sealing and unsealing. Sealing refers to generating sealed data by encrypting target data for protection with the sealed data public key indicated to the secure module 20 along with the environment information expected value of the terminal. Conversely, unsealing refers to outputting plaintext of target data for protection obtained by decrypting sealed data with the sealed data private key when unsealing is successful, i.e. when a comparison of the environment information value set as the condition for unsealing and obtained by decrypting matches the value stored in the environment information register 270 in the secure module 20. The private key used for unsealing is normally stored in a sealed key storage unit 180 other than in the secure module 20 after being encrypted with the root public key 401 of the root key pair 400 stored in the key storage unit 260 in the secure module 20. Accordingly, before unsealing, the sealed data control unit 150 issues a request to the secure module 20 to decrypt the encrypted sealed data private key stored in the sealed key storage unit 180. Upon receipt of the decryption request, the encryption unit 240 decrypts the encrypted sealed data private key using the root private key 402. The decrypted sealed data private key is loaded into the key storage unit 260. The following is a detailed description of sealing and unsealing with reference to FIGS. 11 and 12.

Figure 11:
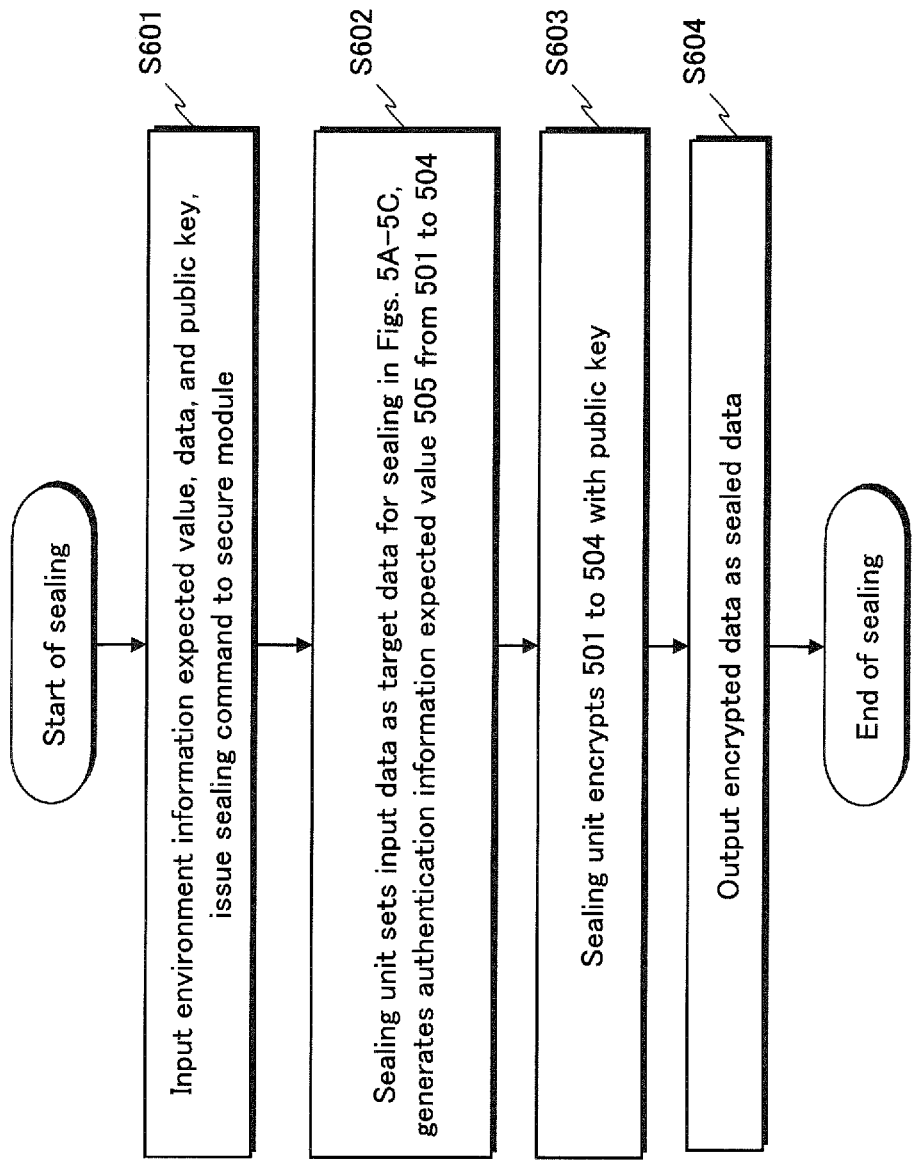
FIG. 11 is a flowchart of sealing in Embodiment 1 of the present invention.

FIG. 11 is a flowchart showing sealing in order to generate sealed data.

The program requesting sealing issues a sealing command to the secure module 20 via the command I/O (210), with the expected value included in the program certificate of the requesting program, the target data for sealing, and the sealed data public key as input parameters (S601). The sealing unit 250 in the secure module 20 sets the input expected value as the expected value 502 of the sealed data and sets the input target data for sealing as the target data for sealing 504 in the sealed data. The sealing unit 250 then calculates the environment information size and the size of the target data for sealing, setting the respective results of calculation as the environment information size 501 and the size of the target data for sealing 503 in the sealed data. The sealing unit 250 then generates the authentication information expected value 505 through the measurement unit 230 (S602). Next, the sealing unit 250 uses the encryption unit 240 to encrypt, with the sealed data public key input in S601, the environment information size 501, expected value 502, size of the target data for sealing 503, and the target data for sealing 504 (S603). Next, the secure module 20 outputs the sealed data via the command I/O (210) (S604). Note that if the secure module 20 is implemented by a TPM or MTM specified by the TCG, the sealing command is implemented as TPM_Seal.

Figure 12:
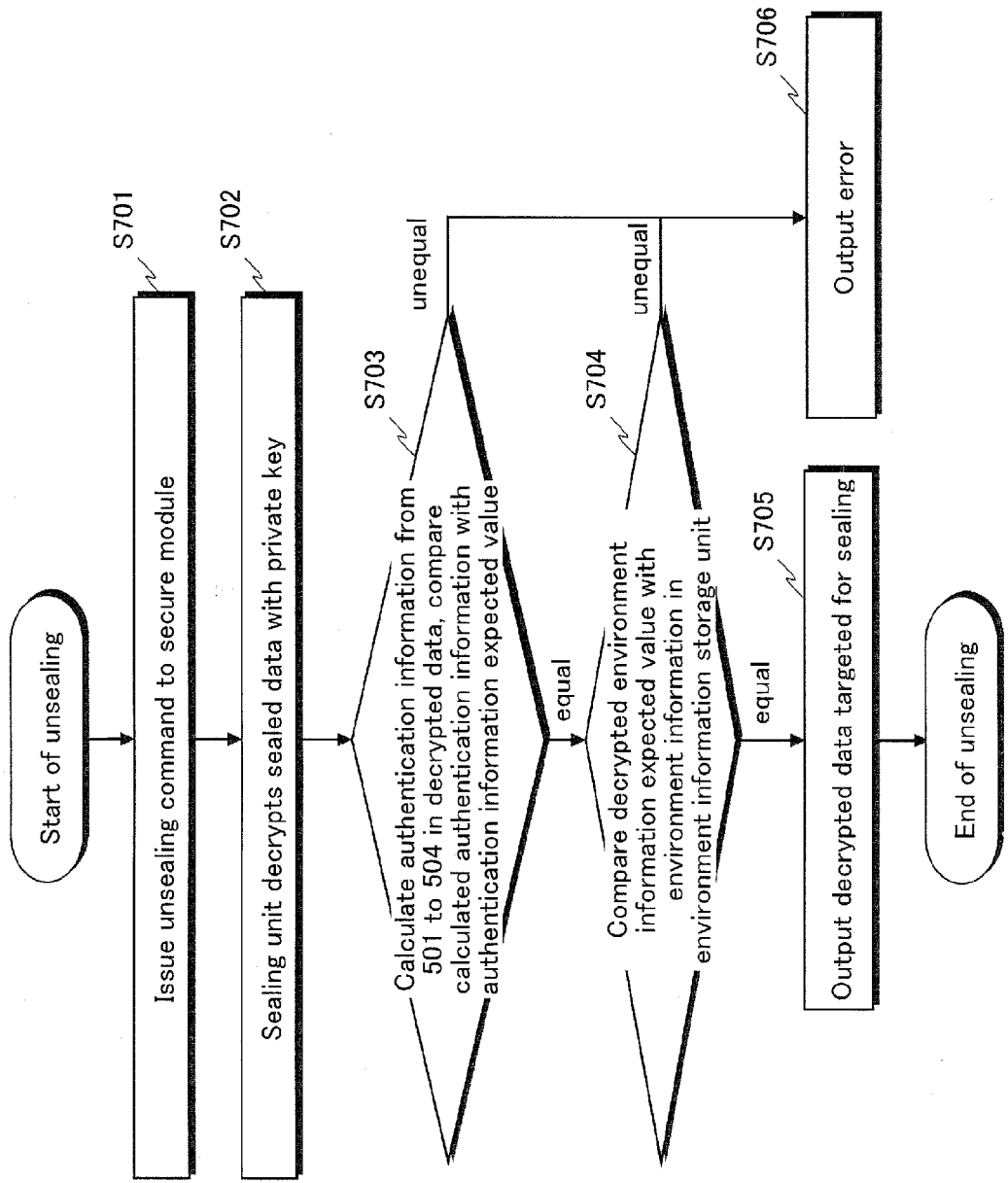
FIG. 12 is a flowchart of unsealing in Embodiment 1 of the present invention.

FIG. 12 is a flowchart showing processing for unsealing of sealed data.

While not shown in FIG. 12, as preliminary processing for unsealing, the secure module 20 decrypts the encrypted sealed data private key (412, 422, 432) corresponding to the target data for unsealing with the root private key 402, setting the resulting decrypted plaintext key in the key storage unit 170 in the secure module 20. Thereafter, the program requesting unsealing issues an unsealing command to the secure module 20 via the command I/O (210) in the secure module 20 (S701). Next, the sealing unit 250 in the secure module 20 decrypts the environment information size 501, expected value 502, size of target data for sealing 503, and the target data for sealing 504 in the sealed data with the sealed data private key (S702). Next, the authentication information is calculated from the sealed data structure from 501 to 504 as decrypted in S702. The certificate information thus calculated is compared with the authentication information expected value 505 to see if these values are equal (S703). If these values are determined to be "unequal" in S703, the secure module 20 outputs an error (S706). On the other hand, if the values are determined to be "equal" in S703, processing proceeds to S704. Next, the sealing unit 250 compares the decrypted expected value 502 with the current value stored in the environment information register in the secure module 20 (S704). If these values are determined to be "unequal" in S704, the secure module 20 outputs an error (S706). On the other hand, if the values are determined to be "equal" in S704, processing proceeds to S705. Next, the secure module 20 outputs the decrypted plaintext target data for sealing 504 via the command I/O (210), and processing for unsealing terminates (S705).

Note that if the secure module 20 is implemented by a TPM or MTM specified by the TCG, the unsealing command is implemented as TPM Unseal.

1.3 Operations

Operations of the information processing system 1 having the above structure, focusing in particular on processing in the information processing terminal 10, are described with reference to flowcharts.

The processing in the information processing terminal 10 can be largely divided into (1) processing for a secure boot, and (2) processing to update a program, performed when a program is updated after a secure boot. A secure boot includes (a) generation of expected values for the secure boot completed state, (b) creation of the sealed data dependency list, and (c) seal updating. Generation of expected values for the secure boot completed state is processing to generate expected values that are used in seal updating. Seal updating is processing to update sealed data or the like when, during a secure boot, after a program unseals sealed data in order to use the data, the unsealed data is updated.

First, (a) generation of expected values for the secure boot completed state and (b) creation of the sealed data dependency list are described. Next, (1) processing for a secure boot and (c) seal updating are described, and finally, (2) processing to update a program is described.

1.3.1 Generation of Expected Values for the Secure Boot Completed State

Figure 13:
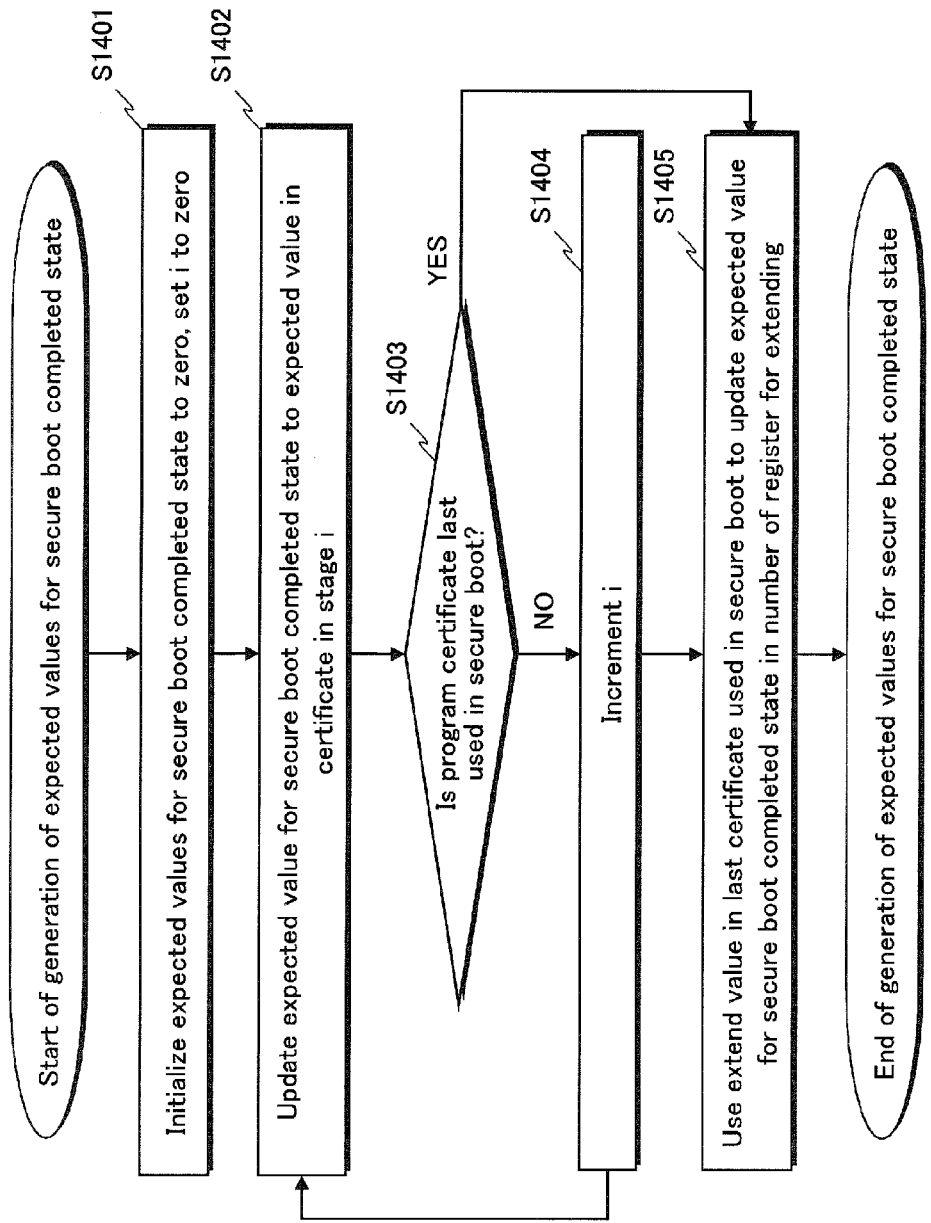
FIG. 13 is a flowchart of generation of expected values for the secure boot completed state in Embodiment 1 of the present invention.

FIG. 13 is a flowchart showing the steps to generate expected values for the secure boot completed state 1300.

The expected values generated by this processing are used in generation of sealed data for use when updating, described below.

The measurement unit 230 first initializes the expected values for the secure boot completed state 1300 to zero and sets an internal variable i indicating the number of the stage to zero (S1401).

The measurement unit 230 retrieves the program certificate in which the expected value for stage i is set and refers to the expected values 902 in the retrieved program certificate. If the expected values 902 differ from the currently stored expected values 1300, the expected values 1300 are updated to the expected values 902 (S1402). Next, it is determined whether the program certificate referred to in S1402 is the last certificate used in the secure boot (S1403). If it is determined in S1403 that the program certificate is the last used in the secure boot (S1403: YES), processing proceeds to S1405. If the program certificate is determined not to be the last used in the secure boot (S1403: NO), processing proceeds to S1404. In order to determine the stage in which each program certificate is used, the certificate storage unit 190 stores a certificate list (not shown in the figures) indicating correspondence between program certificates and the stage in which each program certificate is used. For example, this certificate list is implemented as a list composed of certificate identifying information and stage numbers. In S1402 and S1403, determinations can be made about certificates by referring to this certificate list. Next, the variable i indicating the stage number is incremented (S1404), and processing proceeds to S1402 (S1405). In S1403, if the certificate is the last used in the secure boot (the OS certificate 1031 in the example in FIGS. 5A-5C), the extend value 904 of the certificate that is the last used in the secure boot is used to update the expected value for the secure boot completed state in the register indicated by the number of register for extending 903, and processing terminates (S1405).

The following explains the reason for using not only the OS certificate 1031 that is the last certificate used in the secure boot but rather all of the certificates when generating the expected values for the secure boot completed state 1300. The expected values 902 in each stage set in each certificate do not necessarily list the expected values for all registers. If the environment information register for stage 5 in the OS certificate 1031 that is used last in the secure boot lists the expected value for all registers, then the expected values for the secure boot completed state 1300 can be generated using only the OS certificate 1031. However, if the environment information register for stage 5 in the OS certificate 1031 that is used last in the secure boot does not list the expected value for all registers, then the expected values for the secure boot completed state 1300 cannot be generated using only the OS certificate 1031. Accordingly, all of the certificates are referred to in order to generate the expected values for the secure boot completed state 1300.

Since certificates can be accessed regardless of the current stage, the expected values 902 in each stage set in each certificate are thus used to calculate the expected values for the secure boot completed state 1300. Accordingly, the expected values for the secure boot completed state 1300 can be calculated before arriving at the final stage. In this context, generating sealed data for use when updating by setting the generated expected values for the secure boot completed state 1300 as the condition for unsealing allows for generation, even before completion of a secure boot, of sealed data having the expected values for the secure boot completed state 1300 as the condition for unsealing.

1.3.2 Generation of Sealed Data Dependency List

The sealed data control unit 150 detects unsealing processing that is called during a secure boot, and when unsealing is successful, associates the certificate used in the current stage with sealed data that was successfully unsealed, registering the association in the sealed data dependency list 1600.

Figure 14:
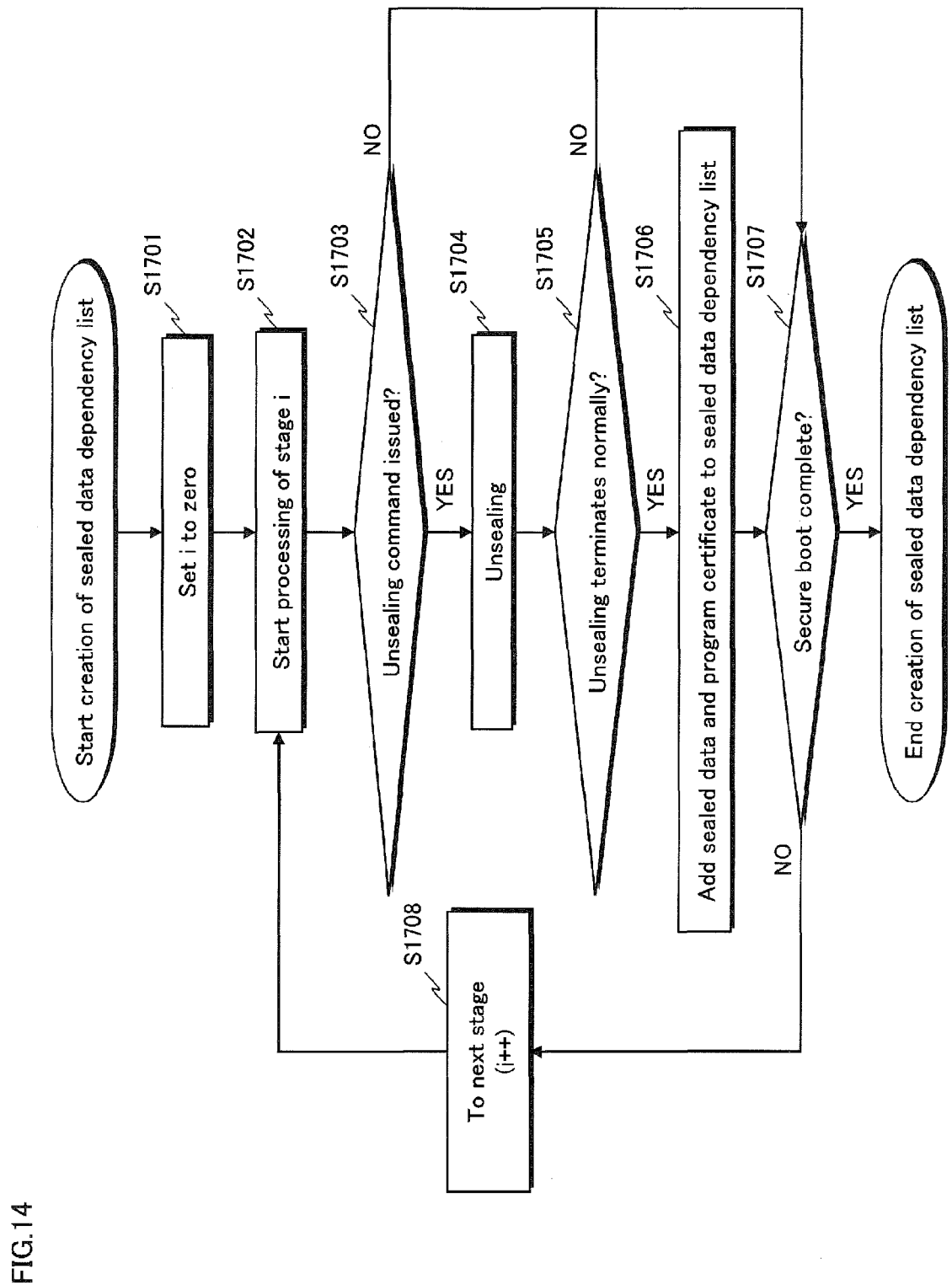
FIG. 14 is a flowchart of generation of a sealed data dependency list in Embodiment 1 of the present invention.

The following is a description of generation of the sealed data dependency list with reference to FIG. 14.

FIG. 14 is a flowchart for generation of a sealed data dependency list 1600.

When the power to the information processing terminal 10 is turned on, the sealed data control unit 150 receives a boot instruction from the CPU 100 and boots up, initializing the internal variable i, used to indicate the stage currently being executed, to zero (S1701). Next, the sealed data control unit 150 receives notification from the CPU 100 that processing in stage i has begun (S1702). During stage i, the sealed data control unit 150 detects whether a request for unsealing is issued to the secure module 20 (S1703). A request for unsealing is detected by hooking an unsealing command. If a request for unsealing is not issued in stage i (S1703: NO), processing proceeds to S1707. On the other hand, if the results of S1703 indicate that an unsealing request has been issued (S1703: YES), processing proceeds to S1704. In S1704, the secure module 20 performs the unsealing processing described in FIG. 12 (S1704). The sealed data control unit 150 determines whether the unsealing in S1704 terminates normally (S1705). If processing does not terminate normally (S1705: NO), processing proceeds to S1706. If it does terminate normally (S1705: YES), processing proceeds to S1706. Next, the sealed data control unit 150 adds, to the sealed data dependency list, the sealed data identifying information 1601 that identifies the sealed data for which unsealing was successful and the certificate identifying information 1602 for the program certificate used in the current stage (S1706). Subsequently, the sealed data control unit 150 receives notification from the CPU 100 that processing in stage i is complete, and based on this notification, determines whether the secure boot is complete (S1707). If the secure boot is determined not to be complete (S1707: NO), i is incremented by one (S1708), and processing proceeds to S1702. If the secure boot is determined to be complete (S1707: YES), then generation of the sealed data dependency list 1600 terminates.

The sealed data dependency list 1600 is thus generated by determining, in each stage, whether there exists sealed data for which unsealing is successful. By referring to the sealed data dependency list 1600, correspondence between pieces of sealed data and stages is reliably managed.

1.3.3 Secure Boot

Figure 15:
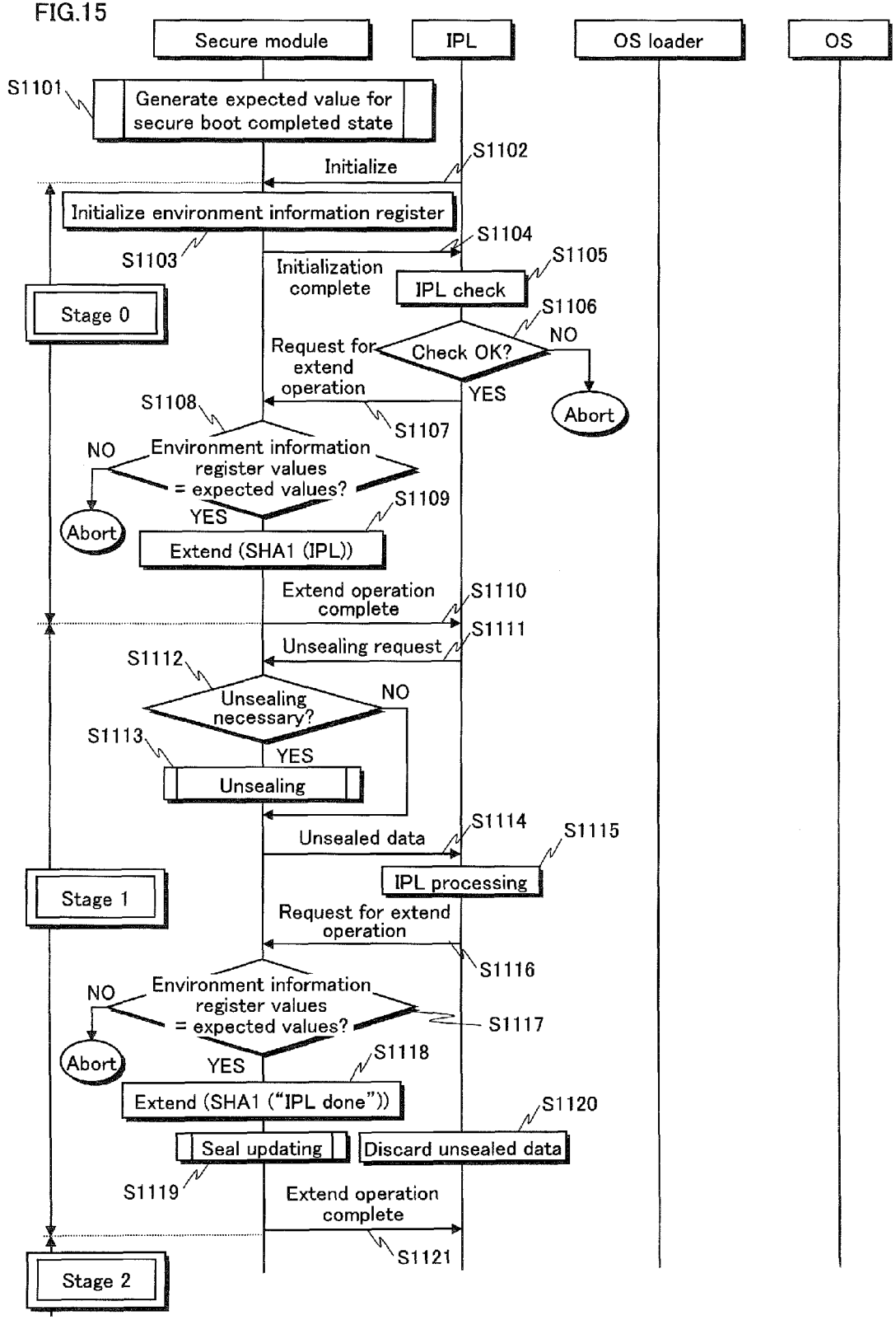
FIG. 15 shows the processing sequence of a secure boot in Embodiment 1 of the present invention.
Figure 16:
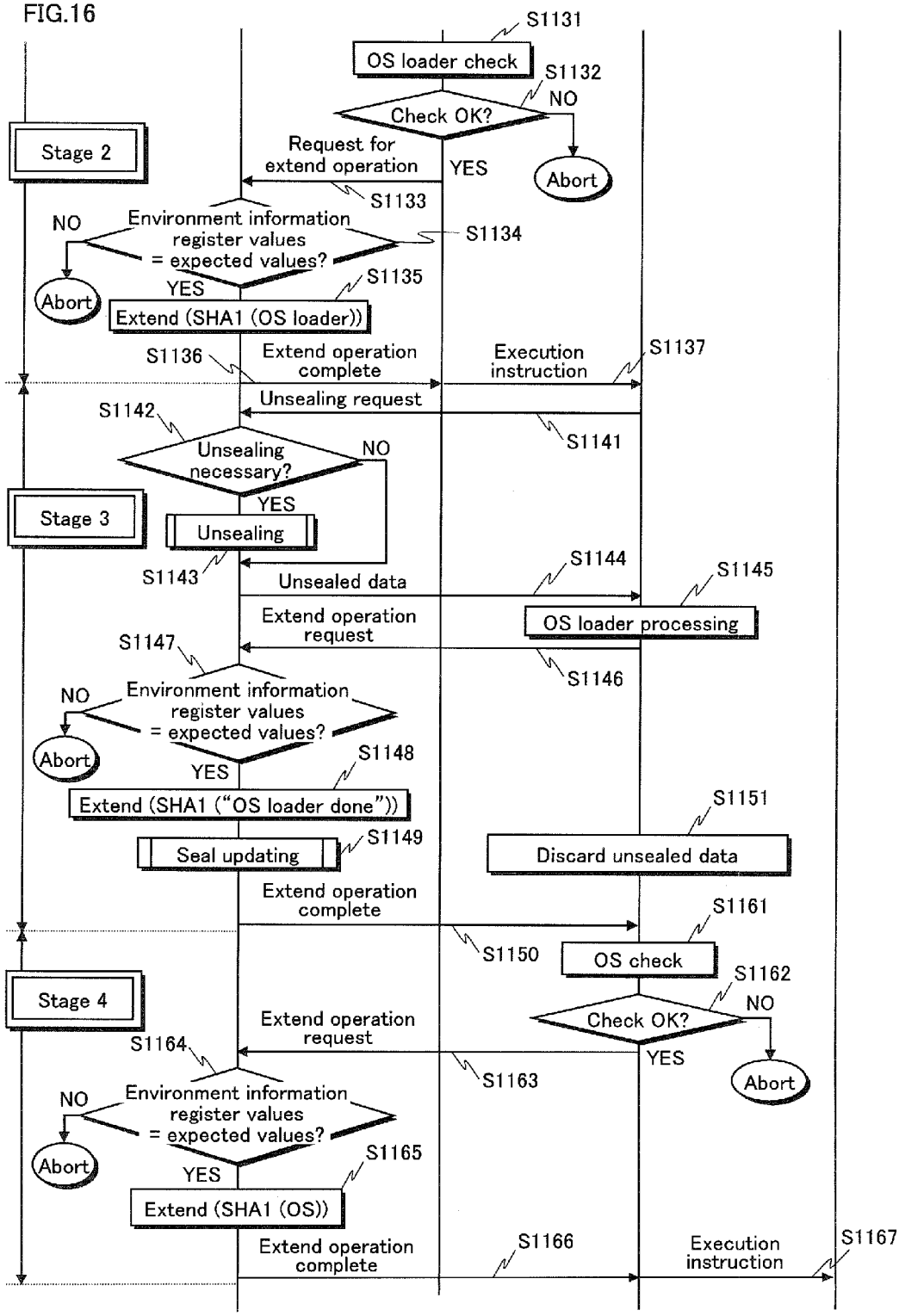
FIG. 16 shows the processing sequence of a secure boot in Embodiment 1 of the present invention (continued from FIG. 15).
Figure 17:
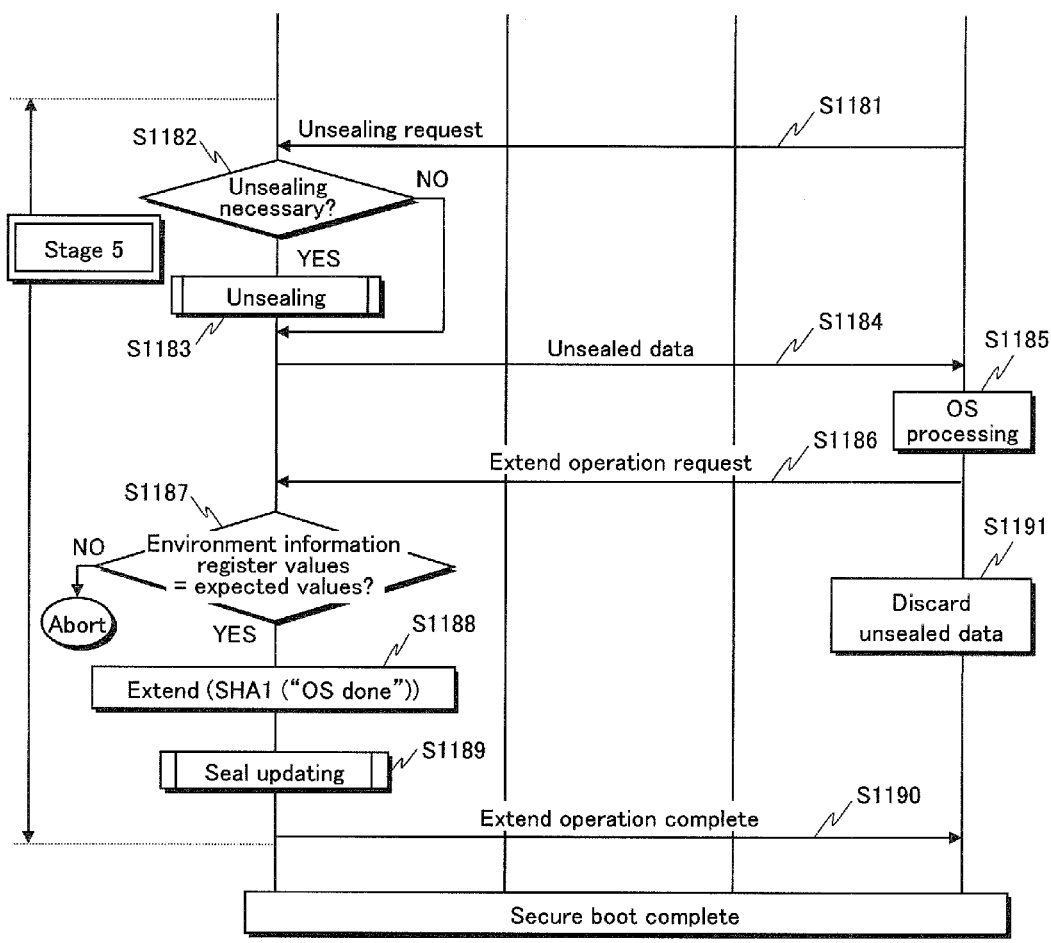
FIG. 17 shows the processing sequence of a secure boot in Embodiment 1 of the present invention (continued from FIG. 16).

The following is a description of the processing sequence of a secure boot with reference to FIGS. 15-17. In this secure boot sequence, the program certificates shown in FIGS. 5A-5C are used. During the secure boot, the sealed data for regular use (310, 320, 330) is used as an example of sealed data for regular use.

(1) Stage 0

First, when the power to the information processing device 10 is turned on, the secure module 20 generates expected values for the secure boot completed state (S1101).

The IPL 101 requests that the secure module 20 perform initialization (S1102).

The IPL 101 executed by the CPU 100 is a program that does not operate actively. However, for the sake of convenience, the program is recited as operating actively, such as when stating that "the IPL 101 performs XX processing". This is because it would complicate the following description to describe operations passively, for example by stating that a program related to XX processing and included in the IPL 101 is executed.

When initialization is requested, the secure module 20 initializes the environment information register 271 to zero (S1103) and returns the result of initialization (normal/abnormal termination) to the IPL 101 (S1104).

While not shown in the figures, the IPL 101 proceeds to the next process when the results of the requested processing indicate normal termination.

Next, the IPL 101 calculates an SHA1 hash value of the IPL 101 and checks the integrity of the IPL 101 by comparing the calculated hash value with SHA1(IPL), the extend value of the IPL certificate 1010 (S1105). If the results of the comparison (S1106) indicate a match (S1106: YES), then integrity is determined to have been maintained, and processing proceeds. Otherwise (S1106: NO), integrity is determined to have been compromised, and processing terminates.

The IPL 101 requests that the secure module 20 perform an extend operation (S1107).

The extend operation request in S1107 includes a request to determine whether the environment information register for stage 0 is the expected value.

The secure module 20 determines whether the environment information register in stage 0 is the expected value by comparing the environment information expected value in stage 0 in the program certificate 1010 with the value stored in the environment information register 271 at the point at which the request in S1104 was received (S1108). If the values are determined to be equal (S1108: YES), the secure boot continues. If the values are determined not to be equal (S1108: NO), the module being booted is considered to be malicious, and booting is aborted.

Next, the secure module 20 performs the extend operation by cumulatively calculating the value of SHA1(IPL), which is the extend value of the IPL certificate 1010, in the environment information register indicated by the value 1 of the number of register for extending in the program certificate 1010 (S1109). The secure module 20 cumulatively calculates the value by concatenating the SHA1 hash value. By performing this processing, authenticity of the environment in the current stage is verified before processing proceeds to the next stage. The secure module 20 then notifies the IPL 101 of completion of the extend operation (S1110).

Notification of completion of the extend operation includes notification of the results of determining whether the value in the environment information register 271 is the expected value. The secure module 20 then proceeds to the next stage, stage 1.

At this point, the IPL 101 (CPU 100) notifies the sealed data control unit 150 of transition to the next stage. Hereinafter, even if not stated explicitly, upon each transition to the next stage, the secure module notifies the CPU 100 of transition to the next stage, and the CPU 100 notifies the sealed data control unit 150 of transition to the next stage. Note that the sealed data control unit 150 creates the sealed data dependency list upon receiving this notification.

(2) Stage 1

The IPL 101 requests that the secure module 20 unseal the sealed data for regular use 1 (310) (S1111). The secure module 20 determines whether unsealing is necessary (S1112). In Embodiment 1, the determination of whether unsealing is necessary is made by the secure module 20 referring to the sealed data dependency list to determine whether sealed data that should be unsealed exists. If unsealing is necessary (S1112: YES), processing for unsealing is performed (S1113). Processing for unsealing has already been described. The secure module 20 transmits the unsealed data to the IPL 101 (S1114). The IPL 101 uses the data received from the secure module 20 to perform IPL processing, i.e. boot processing (S1115). After boot processing, the IPL 101 requests that the secure module 20 perform an extend operation (S1116). The extend operation request in S1116 includes a request to determine whether the environment information register for stage 1 is the expected value.

The secure module 20 determines whether the environment information register in stage 1 is the expected value by comparing the environment information expected value in stage 1 in the program certificate 1010 with the value stored in the environment information register 271 (S1117). If the values are determined to be equal (S1117: YES), the secure boot continues. If the values are determined not to be equal (S1117: NO), the module being booted is considered to be malicious, and booting is aborted.

Next, the secure module 20 performs the extend operation by cumulatively calculating the value of SHA1 ("IPL done"), which is the extend value of the IPL certificate 1011 in stage 1, in the environment information register indicated by the value 2 of the number of register for extending in the program certificate 1010 (S1118). By performing this processing, authenticity of the environment in the current stage is verified before processing proceeds to the next stage. SHA1("IPL done") is the SHA1 hash value of the character sequence "IPL done" and is used as status information indicating that processing of the IPL 101 is complete. Extending this value means that the state in which processing of the IPL 101 is complete remains in the secure module 20.

Next, the secure module 20 performs seal updating (S1119) and provides notification of completion of the extend operation (S1121). Before completion of stage 1, the IPL 101 discards data that was unsealed and used for booting (S1120). Note that the order of S1121 and S1120 may be switched without problem. The secure module 20 then proceeds to the next stage, stage 2. Details on the seal updating are described below.

(3) Stage 2

The IPL 101 performs an OS loader check (S1131). Specifically, in S1131 the IPL 101 calculates an SHA1 hash value of the OS loader 102. The IPL 101 then checks the integrity of the OS loader 102 by comparing the calculated hash value with SHA1(OS loader), the extend value of the OS loader certificate 1020. If the results of the comparison (S1132) indicate a match (S1132: YES), then integrity is determined to have been maintained, and processing proceeds. Otherwise (S1132: NO), integrity is determined to have been compromised, and processing terminates. The IPL 101 requests that the secure module 20 perform an extend operation (S1133). The extend operation request in S1133 includes a request to determine whether the environment information register for stage 2 is the expected value. The secure module 20 determines whether the environment information register in stage 2 is the expected value by comparing the environment information expected value in stage 2 in the OS loader certificate 1020 with the value stored in the environment information register 271 (S1134). If the values are determined to be equal (S1134: YES), the secure boot continues. If the values are determined not to be equal (S1134: NO), the module being booted is considered to be malicious, and booting is aborted.

Next, the secure module 20 performs the extend operation by cumulatively calculating the value of SHA1(OS loader), which is the extend value of the IPL certificate 1020, in the environment information register indicated by the value 1 of the number of register for extending in the program certificate 1020 (S1135). The secure module 20 cumulatively calculates the value by concatenating the SHA1 hash value. By performing this processing, authenticity of the environment in the current stage is verified before processing proceeds to the next stage. The secure module 20 then notifies the IPL 101 of completion of the extend operation (S1136). Notification of completion of the extend operation includes notification of the results of determining whether the value in the environment information register 271 is the expected value. The IPL 101 transmits an execution instruction to the OS loader 102 (S1137). The secure module 20 then proceeds to the next stage, stage 3.

(4) Stage 3

In accordance with the execution instruction, the OS loader 102 begins operations. The OS loader 102 requests that the secure module 20 unseal the sealed data for regular use 2 (320) (S1141). The secure module 20 determines whether unsealing is necessary (S1142). In Embodiment 1, the determination of whether unsealing is necessary is made by the secure module 20 referring to the sealed data dependency list to determine whether sealed data that should be unsealed exists. If unsealing is necessary (S1142: YES), processing for unsealing is performed (S1143). The secure module 20 transmits the unsealed data to the OS loader 102 (S1144). The OS loader 102 uses the data received from the secure module 20 to perform OS loader processing, i.e. boot processing (S1145).

After boot processing, the OS loader 102 requests that the secure module 20 perform an extend operation (S1146). The extend operation request in S1146 includes a request to determine whether the environment information register for stage 3 is the expected value. The secure module 20 determines whether the environment information register in stage 3 is the expected value by comparing the environment information expected value in stage 3 in the OS loader certificate 1021 with the value stored in the environment information register 271 (S1147). If the values are determined to be equal (S1147: YES), the secure boot continues. If the values are determined not to be equal (S1147: NO), the module being booted is considered to be malicious, and booting is aborted.

Next, the secure module 20 performs the extend operation by cumulatively calculating the value of SHA1 ("OS loader done"), which is the extend value of the OS loader certificate 1021 in stage 3, in the environment information register indicated by the value 2 of the number of register for extending in the OS loader certificate 1021 (S1118). By performing this processing, authenticity of the environment in the current stage is verified before processing proceeds to the next stage. SHA1("OS loader done") is the SHA1 hash value of the character sequence "OS loader done" and is used as status information indicating that processing of the OS loader 102 is complete. Extending this value means that the state in which processing of the OS loader 102 is complete remains in the secure module 20.

Next, the secure module 20 performs seal updating (S1149) and provides notification of completion of the extend operation (S1150). Before completion of stage 3, the OS loader 102 discards data that was unsealed and used for booting (S1151). Note that the order of S1151 and S1150 may be shifted without any problem.

The secure module 20 then proceeds to the next stage, stage 4.

(5) Stage 4

The OS loader 102 performs an OS check (S1161). Specifically, during the OS check the OS loader 102 calculates an SHA1 hash value of the OS 103. The OS loader 102 then checks the integrity of the OS 103 by comparing the calculated hash value with SHA1(OS), the extend value of the OS certificate 1030. If the results of the comparison (S1162) indicate a match (S1162: YES), then integrity is determined to have been maintained, and processing proceeds. Otherwise (S1162: NO), integrity is determined to have been compromised, and processing terminates. The OS loader 102 requests that the secure module 20 perform an extend operation (S1163). The extend operation request in S1163 includes a request to determine whether the environment information register for stage 4 is the expected value.

The secure module 20 determines whether the environment information register in stage 4 is the expected value by comparing the environment information expected value in stage 4 in the OS loader certificate 1021 with the value stored in the environment information register 271 (S1164). If the values are determined to be equal (S1164: YES), the secure boot continues. If the values are determined not to be equal (S1164: NO), the module being booted is considered to be malicious, and booting is aborted.

Next, the secure module 20 performs the extend operation by cumulatively calculating the value of SHA1(OS), which is the extend value of the OS certificate 1030, in the environment information register indicated by the value 1 of the number of register for extending in the OS certificate 1030 (S1165). The secure module 20 cumulatively calculates the value by concatenating the SHA1 hash value. By performing this processing, authenticity of the environment in the current stage is verified before processing proceeds to the next stage. The secure module 20 then notifies the OS 103 of completion of the extend operation (S1166). Notification of completion of the extend operation includes notification of the results of determining whether the value in the environment information register 271 is the expected value. The OS loader 102 transmits an execution instruction to the OS 103 (S1167). The secure module 20 then proceeds to the next stage, stage 5.

(6) Stage 5

In accordance with the execution instruction, the OS 103 begins operations. The OS 103 requests that the secure module 20 unseal the sealed data for regular use 3 (330) (S1181).

The secure module 20 determines whether unsealing is necessary (S1182). In Embodiment 1, the determination of whether unsealing is necessary is made by the secure module 20 referring to the sealed data dependency list to determine whether sealed data that should be unsealed exists. If unsealing is necessary (S1182: YES), processing for unsealing is performed (S1183). The secure module 20 transmits the unsealed data to the OS 103 (S1184).

The OS 103 uses the data received from the secure module 20 to perform OS processing, i.e. boot processing (S1185). After boot processing, the OS 103 requests that the secure module 20 perform an extend operation (S1186). The extend operation request in S1186 includes a request to determine whether the environment information register for stage 3 is the expected value. The secure module 20 determines whether the environment information register in stage 5 is the expected value by comparing the environment information expected value in stage 5 in the OS certificate 1031 with the value stored in the environment information register 271 (S1187). If the values are determined to be equal (S1187: YES), the secure boot continues. If the values are determined not to be equal (S1187: NO), the module being booted is considered to be malicious, and booting is aborted.

Next, the secure module 20 performs the extend operation by cumulatively calculating the value of SHA1("OS done"), which is the extend value of the stage 5 OS certificate 1031, in the environment information register indicated by the value 2 of the number of register for extending in the OS certificate 1031 (S1188). By performing this processing, authenticity of the environment in the current stage is verified before processing proceeds to the next stage. SHA1("OS done") is the SHA1 hash value of the character sequence "OS done" and is used as status information indicating that processing of the OS 103 is complete. Extending this value means that the state in which processing of the OS 103 is complete remains in the secure module 20.

Next, the secure module 20 performs seal updating (S1189) and provides notification of completion of the extend operation (S1190). Before completion of stage 5, the OS 103 discards data that was unsealed and used for booting (S1191). Note that the order of S1191 and S1190 may be shifted without any problem. The secure module 20 then transitions to the state of secure boot completion. This concludes the description of FIGS. 15-17.

The following is a supplementary explanation of the values of environment information registers in each stage during the above-described secure boot.

Figure 18:
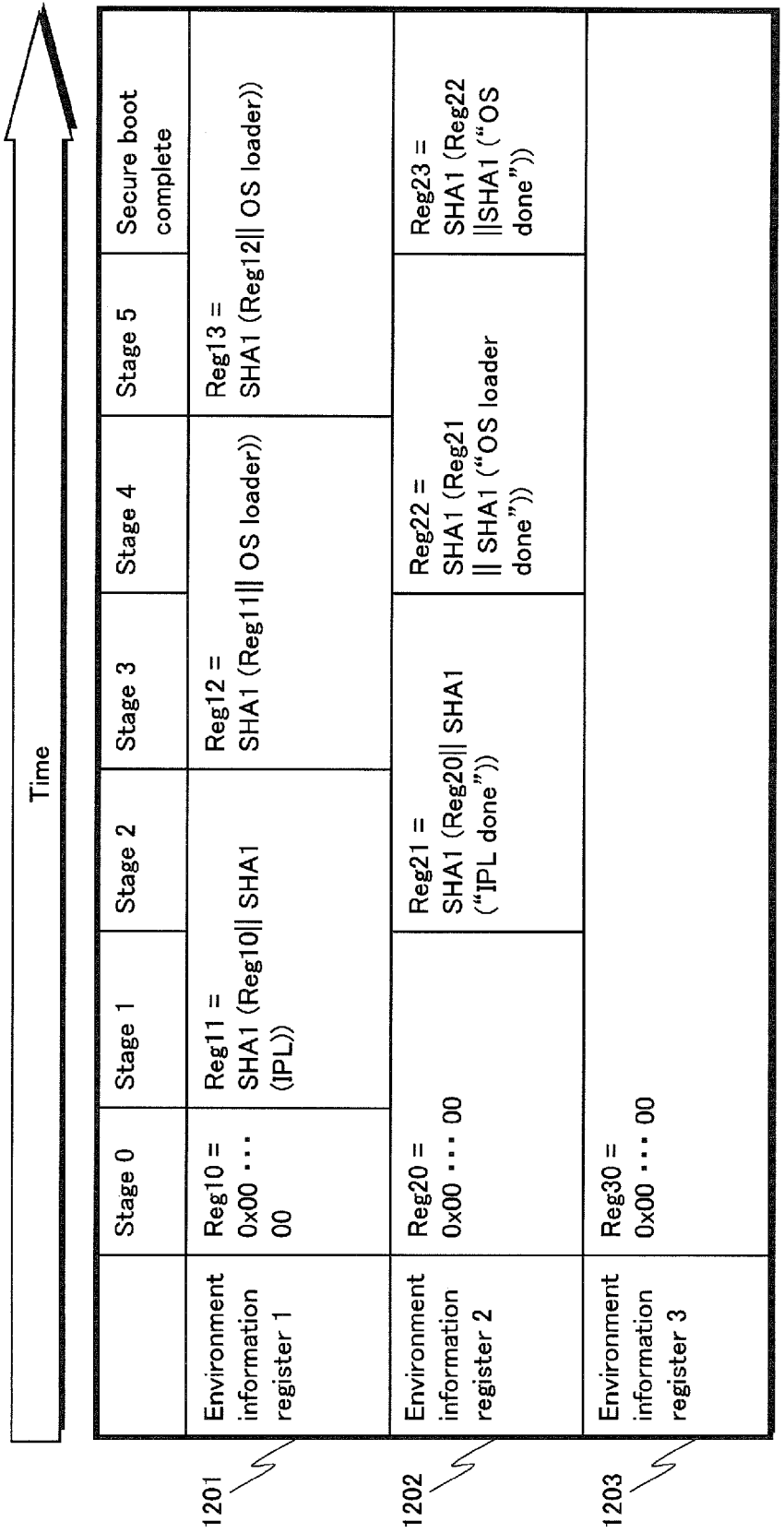
FIG. 18 is a schematic diagram showing an environment information register in each stage during a secure boot in Embodiment 1 of the present invention.

FIG. 18 is a schematic diagram showing values of environment information registers in each stage during the secure boot.

First, in stage 0, the value Reg10 of the environment information register 1201, the value Reg20 of the environment information register 1202, and the value Reg30 of the environment information register 1203 are all zero.

Next, in stage 1, the value Reg21 of the environment information register 1 (1201) becomes SHA1(Reg10∥SHA1 (IPL)). Note that the above notation (A∥B) indicates that A and B are concatenated. The values of the environment information register 2 (1202) and the environment information register 3 (1203) do not change from their values in stage 0.

Next, in stage 2, the value Reg11 of the environment information register 1 (1201) is the same as in stage 1, and the value Reg30 of the environment information register 3 (1203) is the same as in stage 0. On the other hand, the value Reg21 of the environment information register 2 (1202) becomes SHA1(Reg20∥SHA1("IPL done")).

The values of the registers in stages 3, 4, and 5 and the secure boot completed state are as shown in FIG. 18. As a description of these values is the same as above, such description is omitted.

Next, a supplementary explanation is provided regarding the expected values 1300 for values that should be stored in the environment information register 271 for the secure boot completed state.

Figure 19:
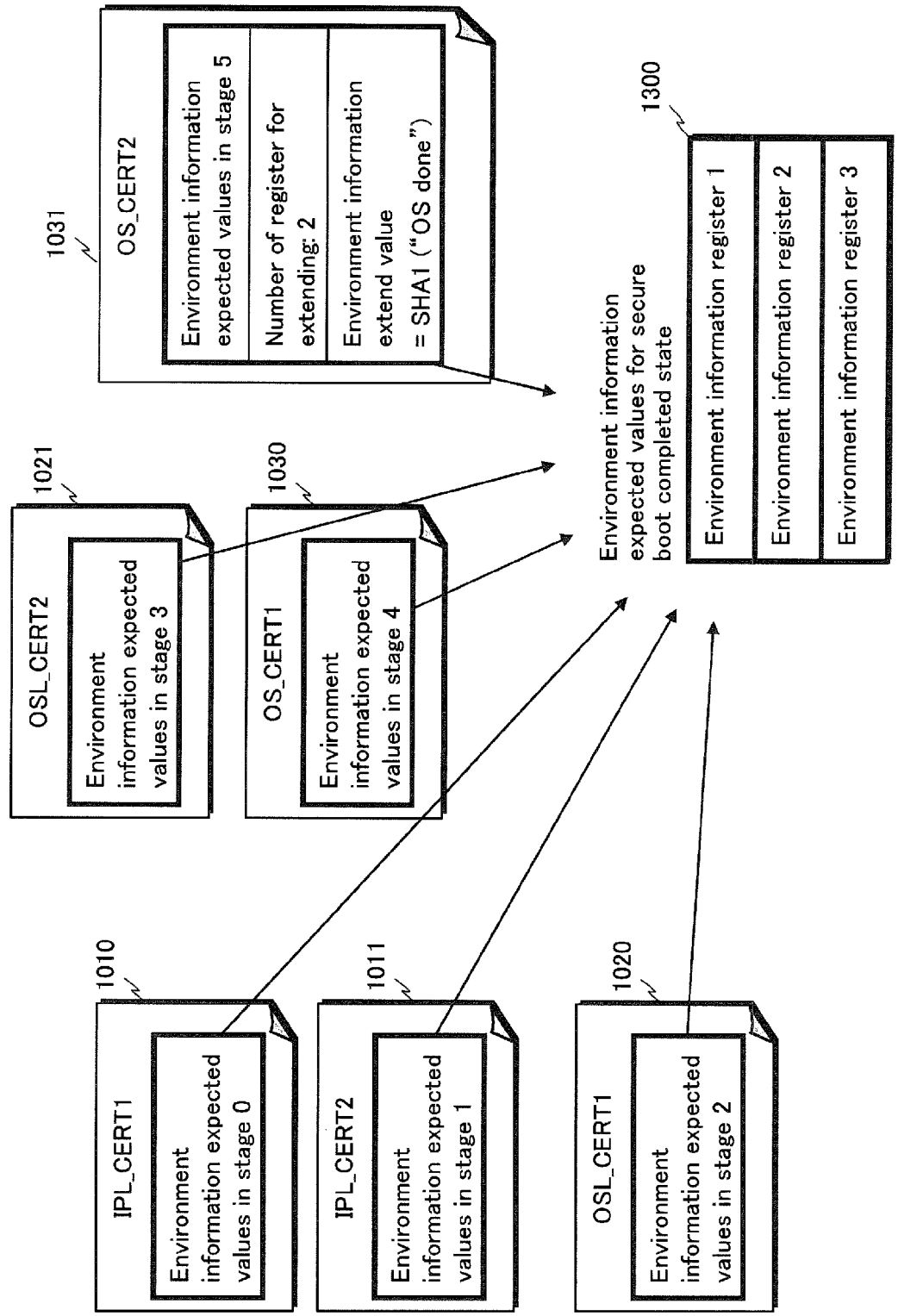
FIG. 19 illustrates generation of expected values for values that should be stored in the environment information register for the secure boot completed state in Embodiment 1 of the present invention.

FIG. 19 illustrates generation of expected values 1300 for values that should be stored in the environment information register 271 for the secure boot completed state. Specifically, FIG. 19 illustrates generation of an environment information register for the secure boot completed state 1300. This register 1300 is generated from the environment information expected value in each stage as listed in the IPL certificates (1010, 1011), OS loader certificates (1021, 1022), and OS certificates (1031, 1032).

1.3.4 Sealed Data Updating

Next, updating of sealed data is described. This is a detailed description of the above processing in S1119, S1149, and S1189.

Note that it is assumed in this processing that the expected values for the secure boot completed state 1300 have already been generated.

The sealed data control unit 150 determines whether seal updating is necessary (S1801).

In Embodiment 1, it is determined that seal updating is necessary if the value of the sealed data 504 is updated in the current stage and the updated value needs to be stored.

If it is determined that updating is not necessary (S1801: NO), processing for seal updating terminates.

If it is determined that updating is necessary (S1801: YES), plaintext target data for sealing 504 is sealed with the current environment information register expected value 271 (S1802).

Plaintext target data for sealing 504 is also sealed with the expected values for the secure boot completed state 1300, and the resulting sealed data is recorded in a storage area for sealed data for use when updating 32 in the sealed data storage unit 170 as sealed data for use when updating (S1803). Processing for seal updating then terminates.

An example of a use case in which updating of sealed data is necessary is when a certain piece of software is targeted for a secure boot and has a limit on the number of times it can be booted. Information on the limit on the number of boots is protected by sealing. In this case, data on the number of boots needs to be updated each time the power is turned on, and after updating, the data on the number of boots needs to be stored. Accordingly, data on the number of boots is determined to require seal updating. The determination on whether seal updating is necessary may be made based on an attribute attached to data that is handled. Data to which an update attribute is attached could then be resealed at each bootup.

Figure 20:
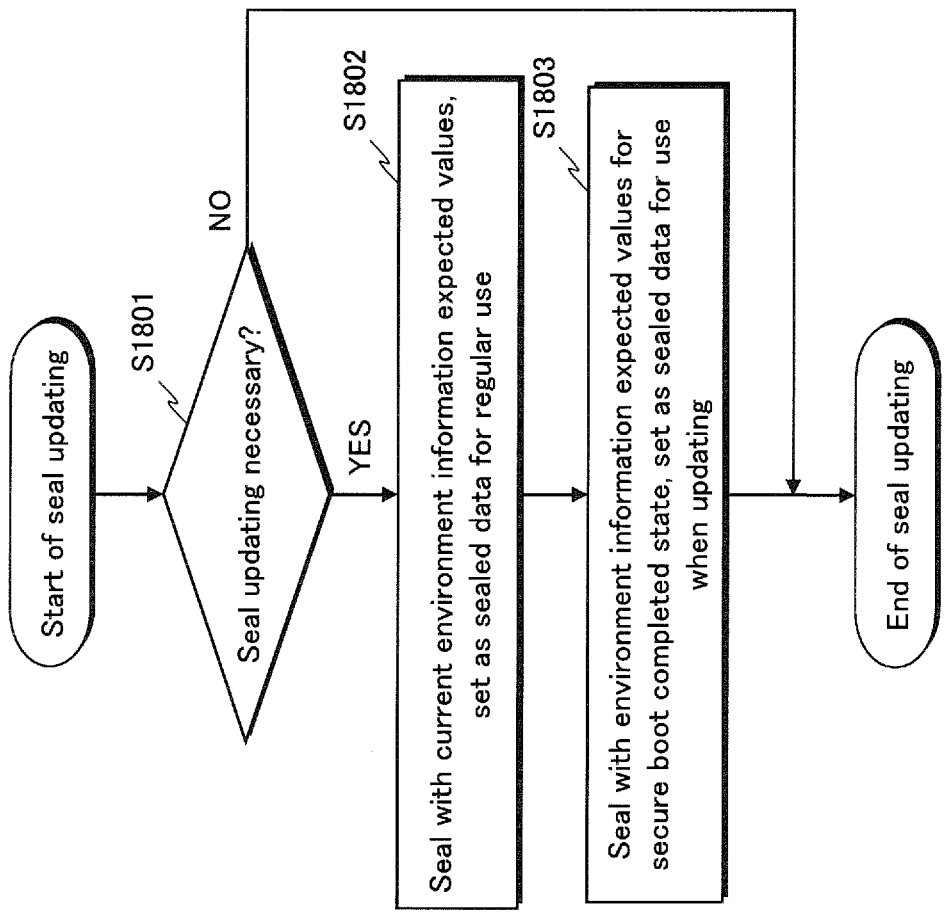
FIG. 20 is a flowchart of generation of sealed data for use when updating in Embodiment 1 of the present invention.

This concludes the description of the flowchart in FIG. 20 for generating sealed data for use when updating.

1.3.5 Processing During Program Updating

Figure 21:
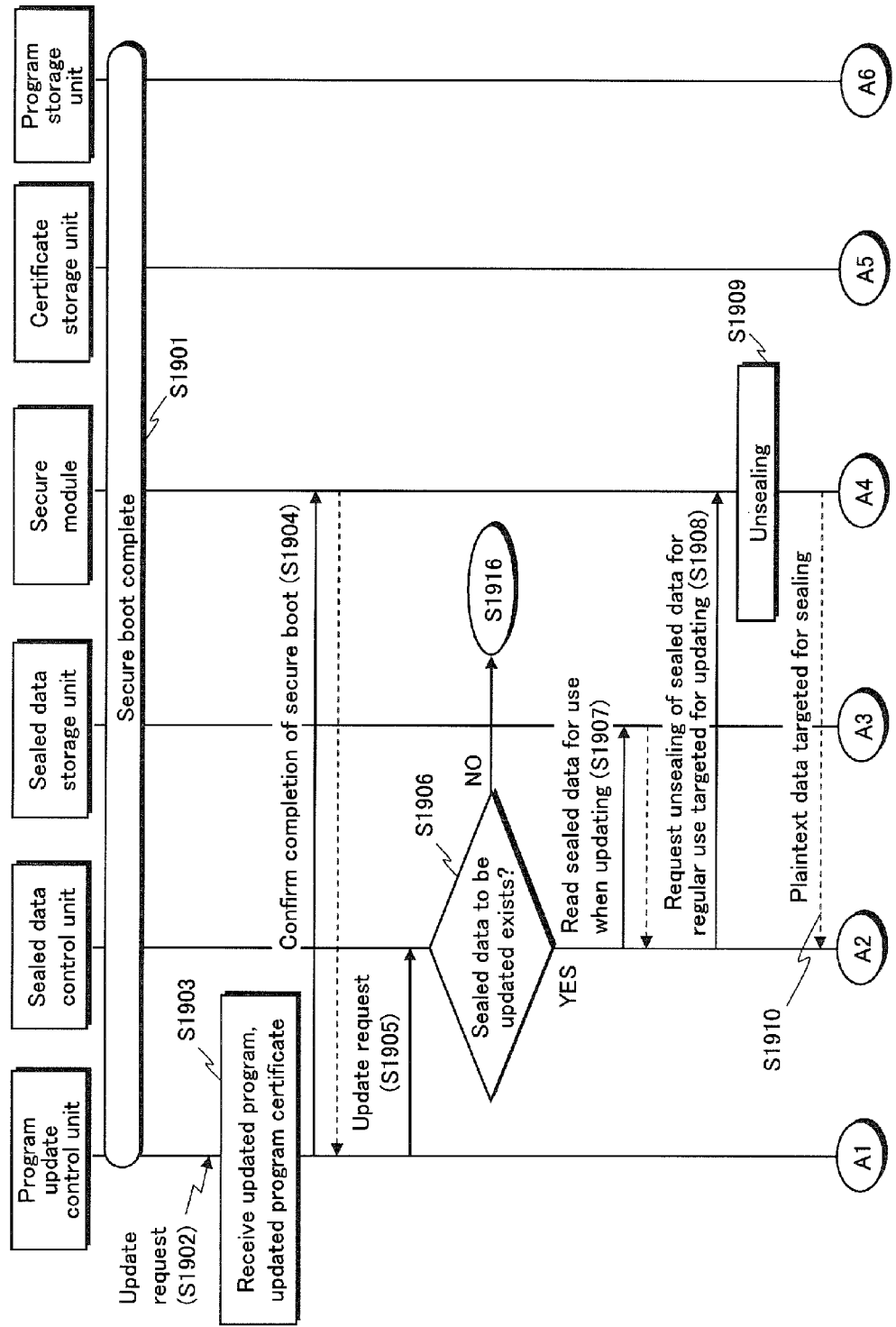
FIG. 21 is a flowchart of processing during updating of a program that is the target of a secure boot in Embodiment 1 of the present invention.
Figure 22:
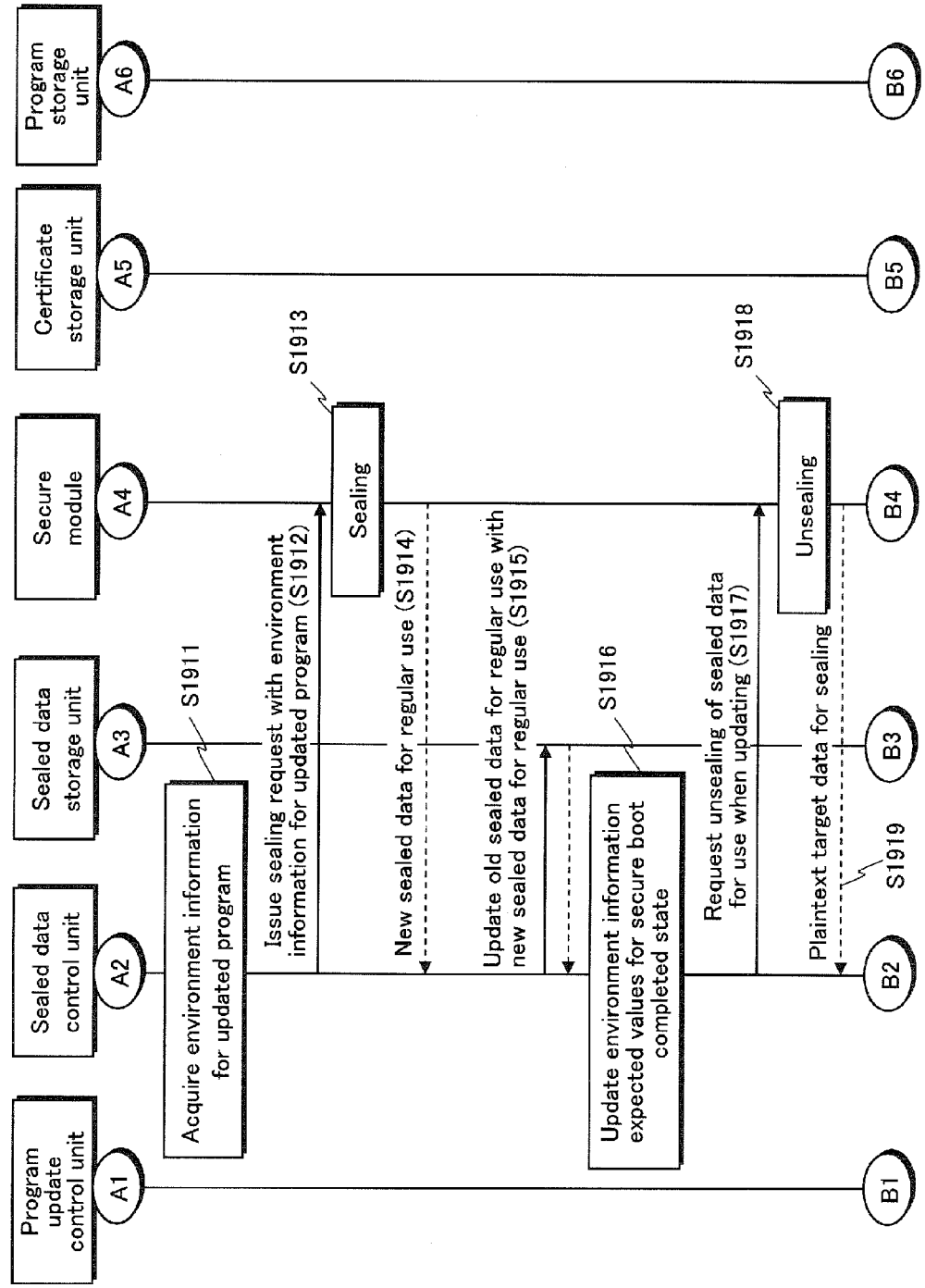
FIG. 22 is a flowchart of processing during updating of a program that is the target of a secure boot in Embodiment 1 of the present invention (continued from FIG. 21).
Figure 23:
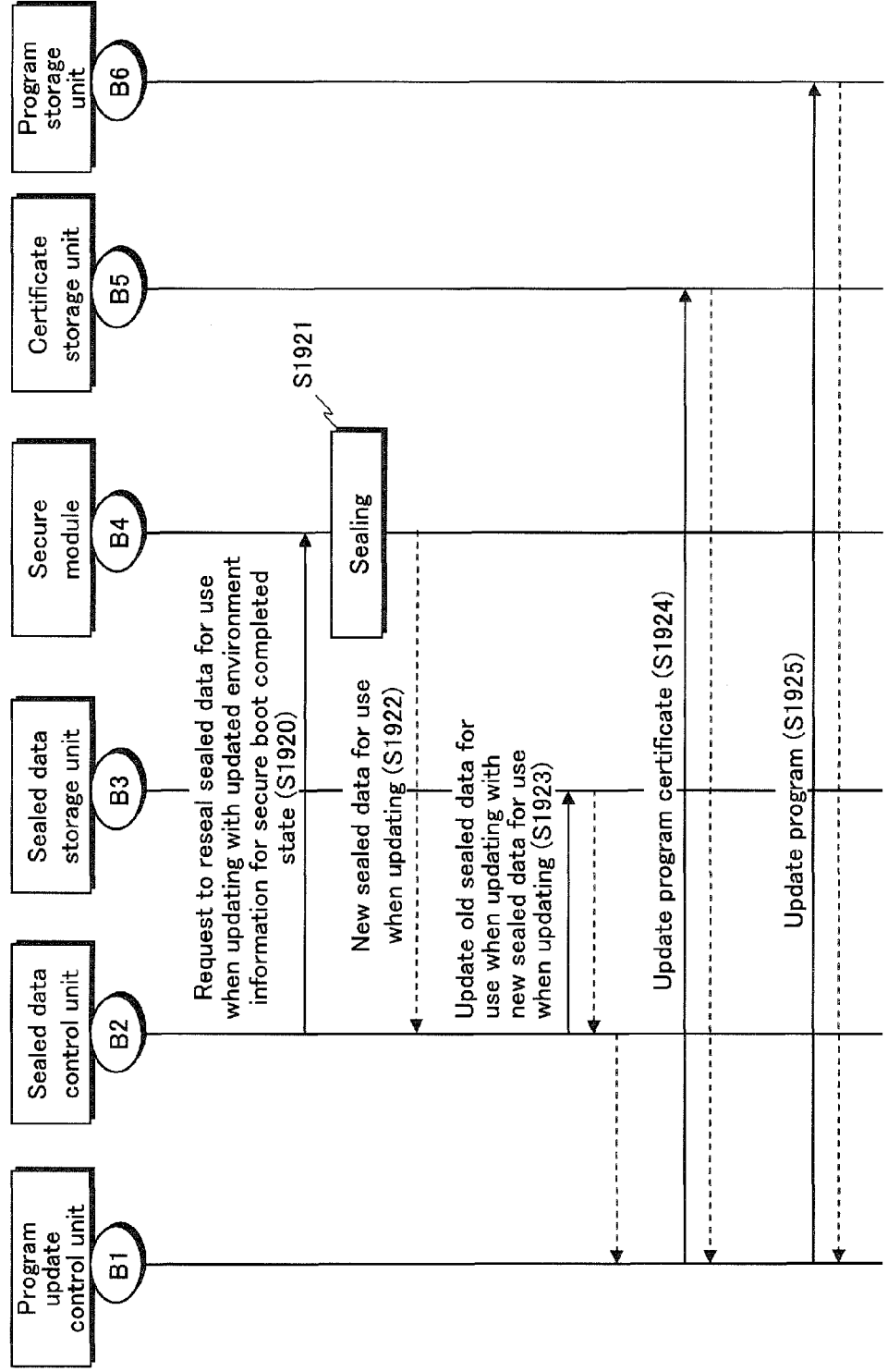
FIG. 23 is a flowchart of processing during updating of a program that is the target of a secure boot in Embodiment 1 of the present invention (continued from FIG. 22).

The following is a description of processing during updating of a program targeted for a secure boot with reference to FIGS. 21-23. Note that it is assumed in the following description that the information processing device 10 is storing sealed data for use when updating stored therein.

This sequence is performed after a secure boot is complete (S1901). When a program is to be updated, the updated program distribution server 11 transmits a program update request to the information processing terminal 10. The program update control unit 140 in the information processing terminal 10 receives the program update request transmitted by the updated program distribution server 11 (S1902). Next, the program update control unit 140 receives an updated program and a program certificate corresponding to the updated program from the updated program distribution server 11 (S1903). The program update control unit 140 then uses the expected values for the secure boot completed state 1300 to confirm whether the secure boot was completed normally (S1904). If the results of S1904 indicate that the secure boot was not completed normally, the program update control unit 140 terminates update processing. If the secure boot was completed normally, processing proceeds to S1905. Next, the program update control unit 140 issues a program update request to the sealed data control unit 150 (S1905). Upon receiving the program update request, the sealed data control unit 150 refers to the sealed data dependency list 1600 to determine whether sealed data for regular use that corresponds to the program certificate received in S1903 and that should be updated exists (S1906). If the results of S1906 are that "no data to be updated exists" (S1906: NO), then processing proceeds to S1916. If the results of S1906 are that "data to be updated exists" (S1906: YES), then processing proceeds to S1907.

Next, the sealed data control unit 150 reads, from the sealed data storage unit 170, sealed data for use when updating corresponding to the sealed data for regular use for which it was determined that "data to be updated exists" (S1907). The sealed data control unit 150 then issues a request to the secure module 20 to unseal the sealed data for use when updating that is read in S1907 (S1908).

Having received the request for unsealing, the secure module 20 unseals the sealed data for use when updating as requested in S1908 based on the procedures shown in the flowchart in FIG. 12 (S1909). Next, the sealed data control unit 150 acquires plaintext target data for sealing that has been unsealed (S1910). The sealed data control unit 150 then refers to the program certificate acquired in S1903 to acquire the new condition for unsealing of the sealed data for regular use to be updated (S1911). Subsequently, the sealed data control unit 150 issues a sealing request to the secure module 20, inputting the plaintext target data for sealing acquired in S1910, the expected values that are the new condition for unsealing acquired in S1911, and the sealed data public key (S1912). Next, the secure module 20 seals the data as requested in S1912 via the above-described processing (S1913). The sealed data control unit 150 then acquires, from the secure module 20, the sealed data having the expected values acquired in S1911 as the condition for unsealing (S1914). The sealed data control unit 150 deletes the sealed data for regular use read in S1907 from a storage area for sealed data for regular use 31 and stores the sealed data acquired in S1914 as updated sealed data for regular use in the storage area for sealed data for regular use 31 (S1915). Sealed data for regular use that is to be updated is thus actually updated. In the figures, this processing is not a loop, but in practice, if there is a plurality of pieces of sealed data for regular use to be updated, the processing from S1905 to S1915 is repeated for each piece of sealed data.

Next, processing from S1916 to S1923 to update sealed data for use when updating is described.

If a program targeted for a secure boot is updated, the expected values for the secure boot completed state 1300 of course change as well, and sealed data for use when updating also needs to be updated.

First, the expected values for the secure boot completed state 1300 are updated (S1916). The steps for this processing have already been described.

Next, the sealed data control unit 150 issues a request to unseal all of the sealed data for use when updating (S1917). Since the information processing terminal 10 has been booted securely, this unsealing is possible. The secure module 20 then unseals the sealed data for use when updating as requested in S1917 based on the processing flow in FIG. 12 (S1918).

Next, the sealed data control unit 150 acquires, from the secure module 20, plaintext target data for sealing that is yielded by unsealing the sealed data for use when updating (S1919). The sealed data control unit 150 then issues a request to seal the sealed data for use when updating with the expected values for the secure boot completed state 1300 that have been generated in S1916 and correspond to the updated program (S1920). The secure module 20 seals the expected values for the secure boot completed state 1300 after updating based on the processing flow in FIG. 12 (S1921). The sealed data control unit 150 then acquires, from the secure module 20, the sealed data for use when updating sealed in S1921 (S1922). Next, the sealed data control unit 150 deletes the sealed data for use when updating that was requested to be unsealed in S1912 from the storage area for sealed data for use when updating 32 and stores the sealed data acquired in S1922 as updated sealed data for use when updating in the storage area for sealed data for use when updating 32 (S1923). In this way, sealed data for use when updating is also updated as sealed data having, as the condition for unsealing, expected values for the secure boot completed state after program updating. In the figures, this processing is not a loop, but in practice, the processing from S1917 to S1923 is repeated for each piece of sealed data for use when updating. Next, in S1924 and S1925, a program for updating and its program certificate are updated. The program update control unit 140 updates an old certificate in the certificate storage unit 190 using the program certificate received in S1903 (S1924). Next, the program update control unit 140 updates the program with the updated program received in S1903 (S1924).

With the above structure, sealed data that has expected values during a secure boot as the condition for unsealing can be updated after completion of the secure boot. It is therefore not necessary to reboot the information processing terminal 10, which makes program updating more convenient.

This concludes the description of Embodiment 1.

2. Embodiment 2

The following describes Embodiment 2. Embodiment 2 supports rollback. Rollback refers to restoring a program to a previous version. In Embodiment 1, when sealed data for regular use is updated, the old sealed data for regular use is deleted from the storage area for sealed data for regular use 31 in the sealed data storage unit 170, and the new, updated sealed data for regular use is then written into the storage area for sealed data for regular use 31. By contrast, in Embodiment 2, old sealed data for regular use is not deleted from the storage area for sealed data for regular use 31 in the sealed data storage unit 170, but rather is saved. The saved sealed data for regular use is stored in a sealed data for rollback storage area 2200 in the sealed data storage unit 170.

Note that below, a description of constituent elements that are the same as in Embodiment 1 is omitted.

2.1 Sealed Data Storage Unit Supporting Rollback

Figure 24:
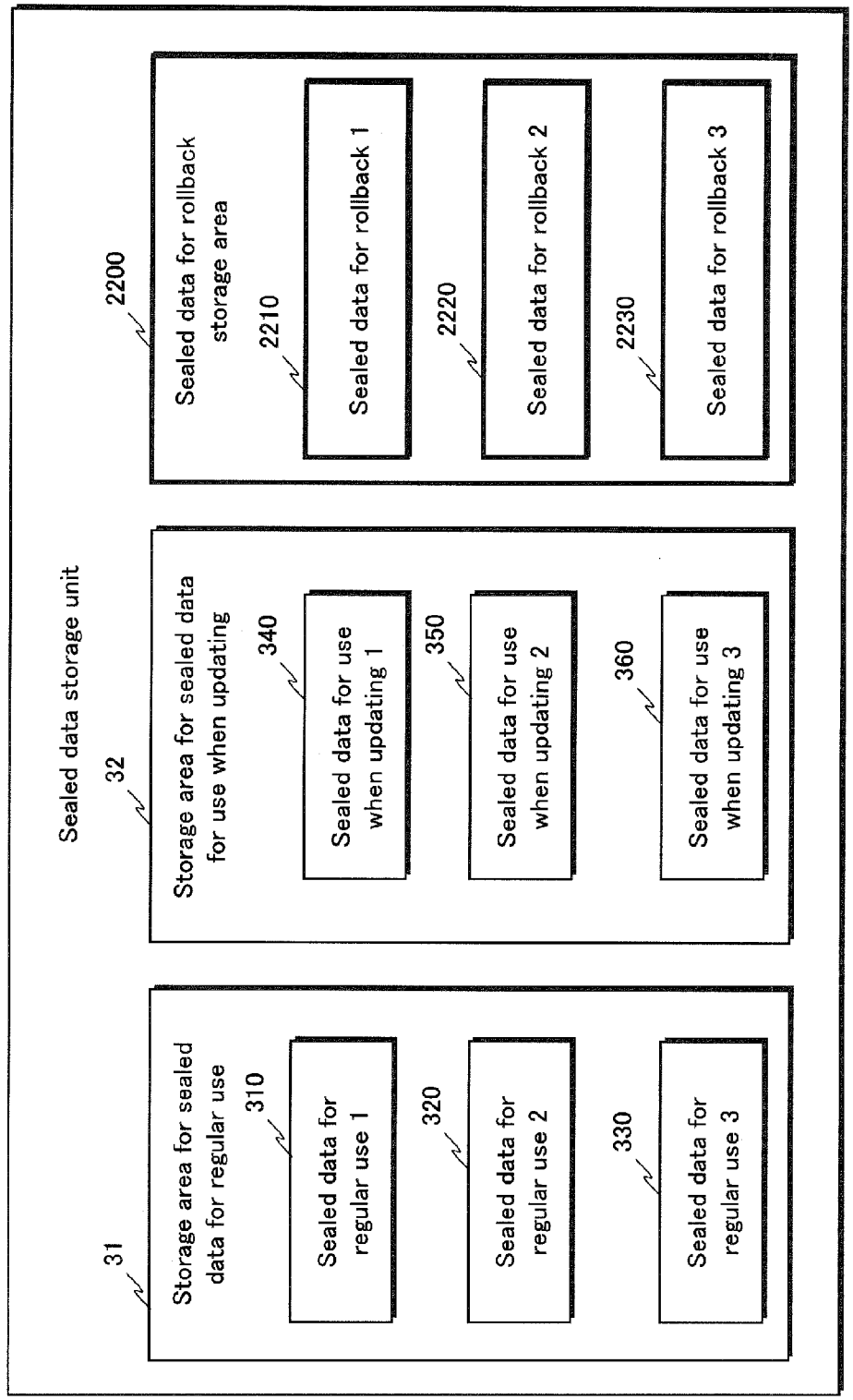
FIG. 24 shows a sealed data storage unit supporting rollback in Embodiment 2 of the present invention.

FIG. 24 shows a sealed data storage unit 170 that supports rollback. Embodiment 2 differs from Embodiment 1 in the addition of the sealed data for rollback storage area 2200. The sealed data for rollback storage area 2200 is an area for saving old sealed data for regular use when sealed data for regular use is updated, instead of deleting the old sealed data for regular use from the storage area for sealed data for regular use 31. The data structure of sealed data for rollback (2210, 2220, 2230) is the same as in FIGS. 5A-5C in Embodiment 1.

In FIG. 24, the sealed data for rollback 1 (2210) is sealed data used for rollback corresponding to sealed data for regular use 1 (310). The sealed data for rollback 2 (2220) is sealed data used for rollback corresponding to sealed data for regular use 2 (320). The sealed data for rollback 3 (2230) is sealed data used for rollback corresponding to sealed data for regular use 3 (330).

2.2 Sequence During Update Request

Figure 25:
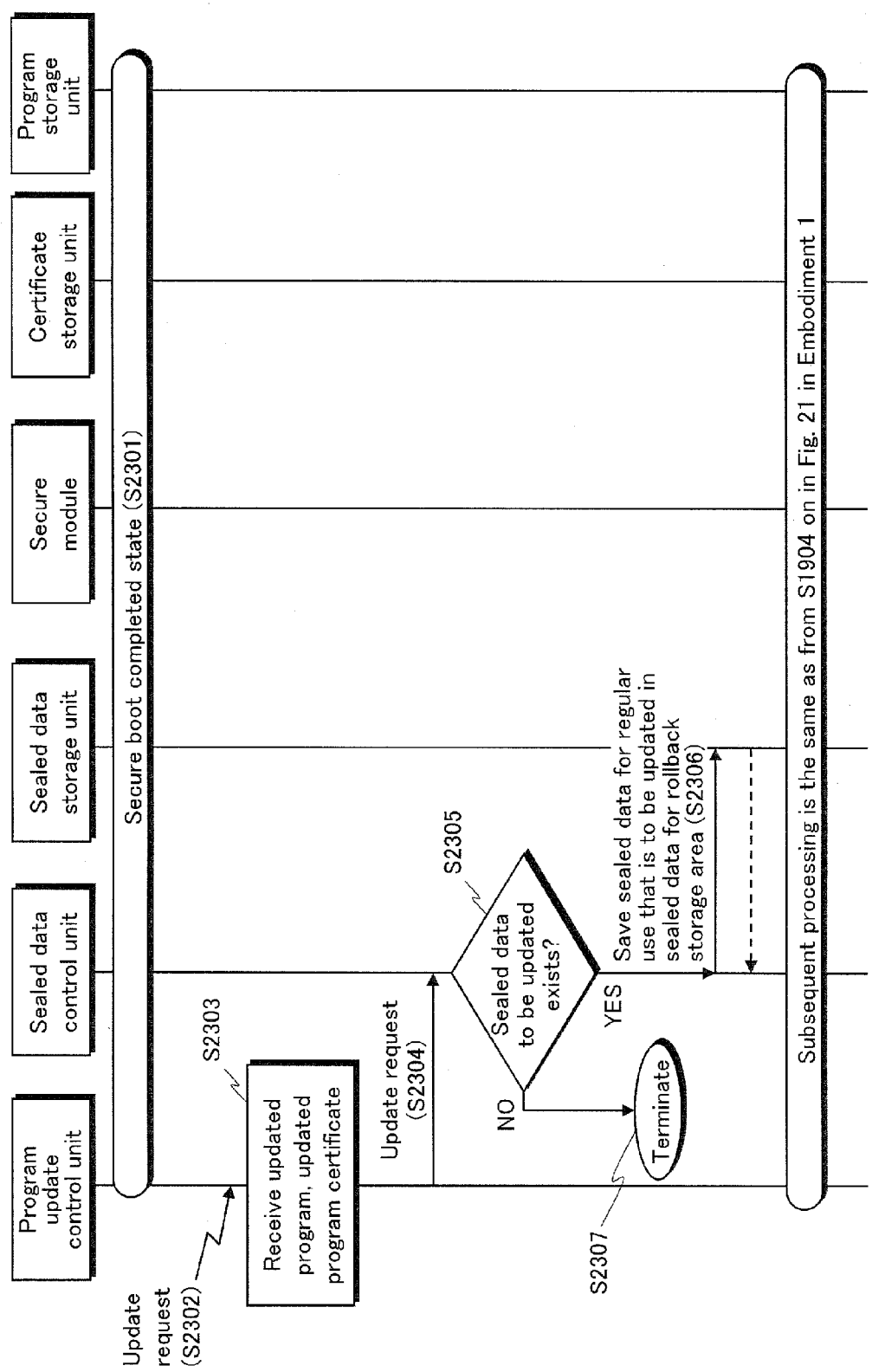
FIG. 25 is a flowchart of processing during a program update request in Embodiment 2 of the present invention.

FIG. 25 is a processing sequence in Embodiment 2 upon a request to update a program targeted for a secure boot.

First, the information processing terminal 10 has been booted securely (S2301). Next, the program update control unit 140 receives notification of a request to update a program from the updated program distribution server 11 (S2302). The program update control unit 140 then receives an updated program and a program certificate required during updating from the updated program distribution server 11 (S2303). Next, the program update control unit 140 issues a program update request to the sealed data control unit 150 (S2304). Upon receiving the program update request, the sealed data control unit 150 refers to the sealed data dependency list 1600 to determine whether sealed data for regular use that corresponds to the program certificate received in S2303 and that should be updated exists (S2305). If the results of S2305 are that "no data to be updated exists" (NO in FIG. 25), then processing proceeds to S2307. If the results of S2305 are that "data to be updated exists" (YES in FIG. 25), then processing proceeds to S2306. Next, the sealed data control unit 150 saves the sealed data for regular use for which it was determined that "data to be updated exists" in the sealed data for rollback storage area 2200 (S2306).

2.3 Sequence During Rollback

Figure 26:
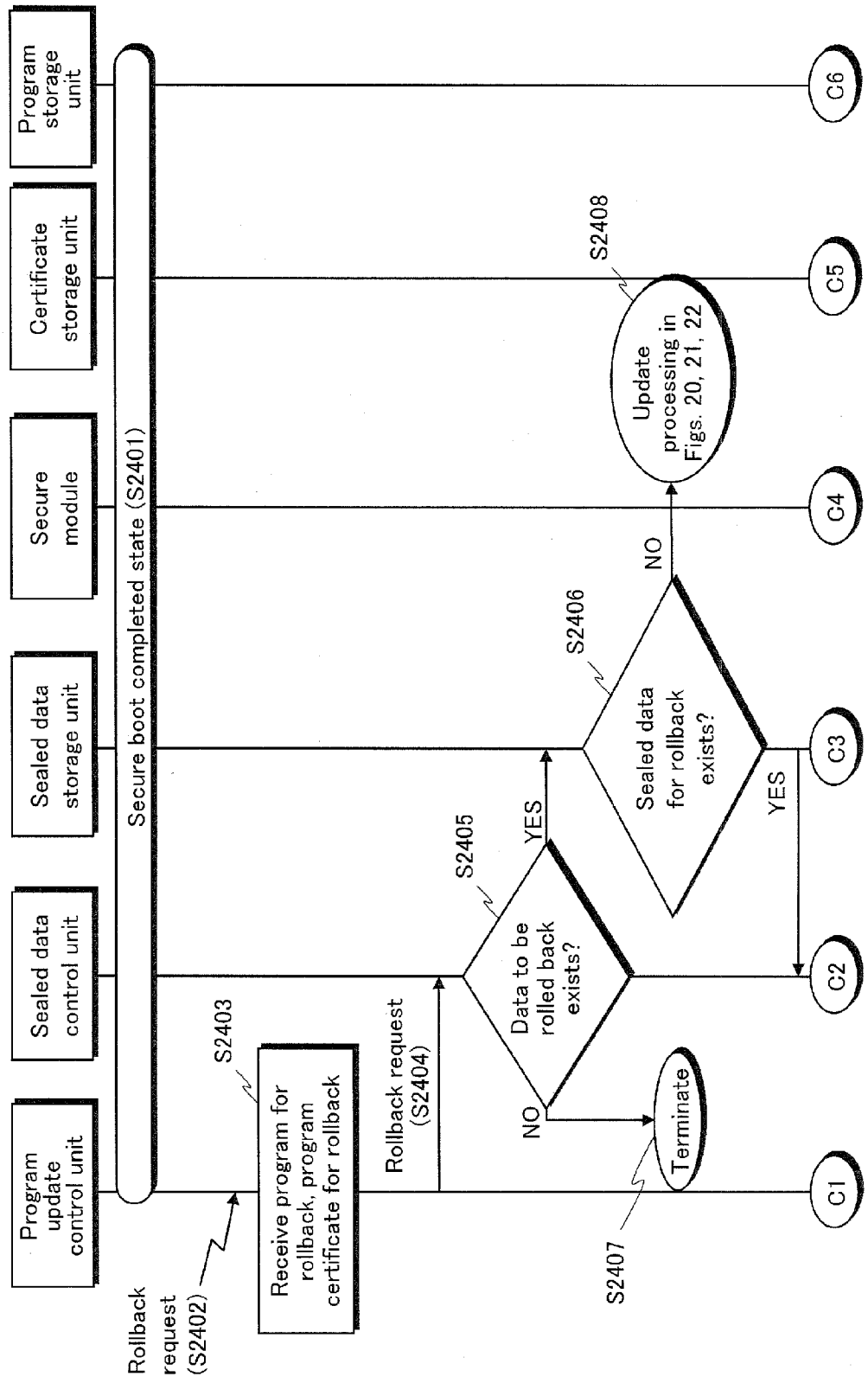
FIG. 26 is a flowchart of processing during a program rollback request in Embodiment 2 of the present invention.
Figure 27:
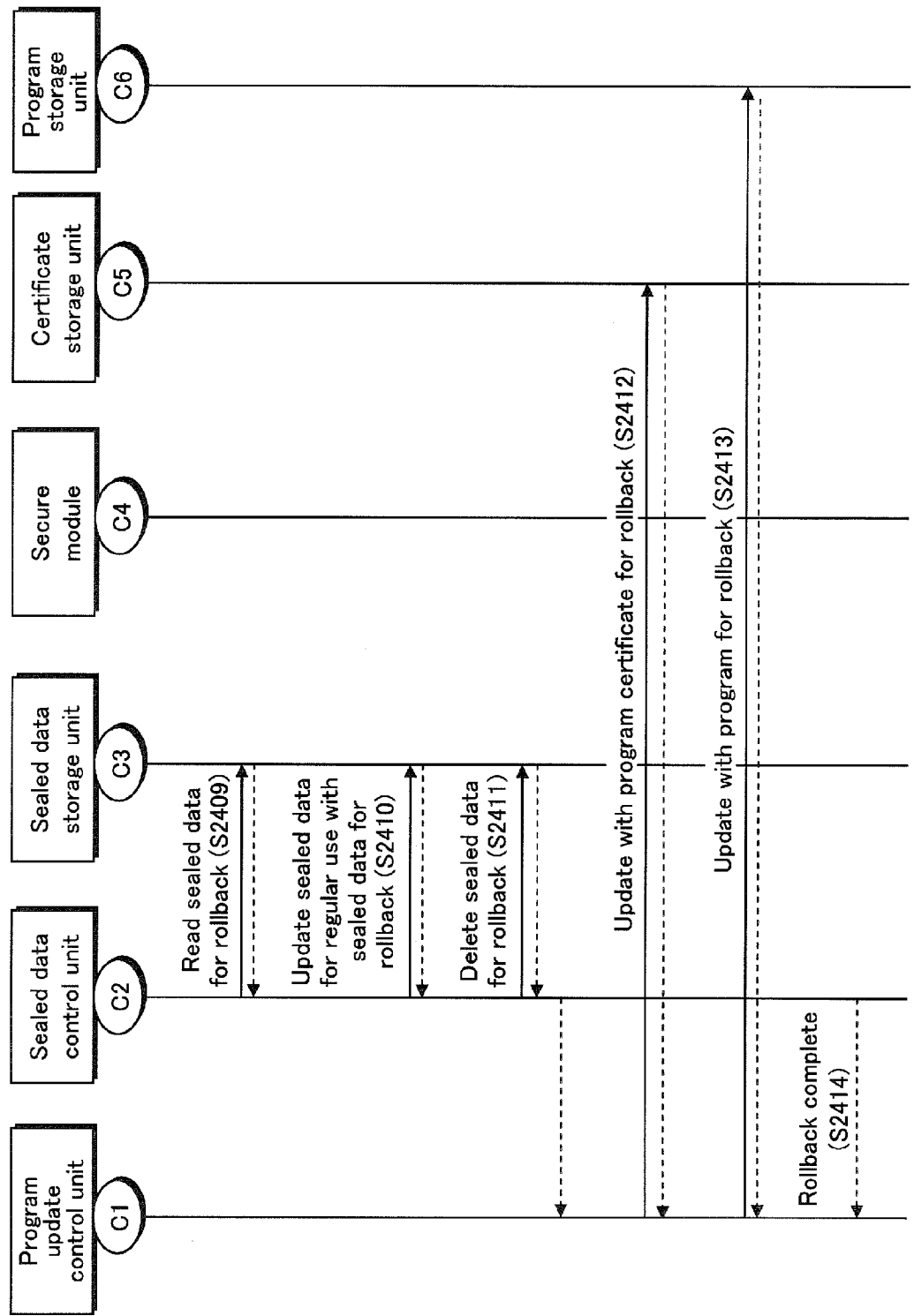
FIG. 27 is a flowchart of processing during a program rollback request in Embodiment 2 of the present invention (continued from FIG. 26).

FIGS. 26 and 27 show the processing sequence during a rollback request.

First, the information processing terminal 10 has been booted securely (S2401). Next, the program update control unit 140 receives notification of a request to rollback an updated program from the updated program distribution server 11 (S2402). The program update control unit 140 then receives a program for rollback and a program certificate necessary for rollback (S2403). Next, the program update control unit 140 issues a rollback request to the sealed data control unit 150 (S2404). Upon receiving the program rollback request, the sealed data control unit 150 refers to the sealed data dependency list 1600 to determine whether sealed data for regular use that corresponds to the program certificate received in S2403 and that should be rolled back exists (S2405). If the results of S2405 are that "no data to be rolled back exists" (S2405: NO), then processing proceeds to S2407. If the results of S2405 are that "sealed data to be rolled back exists" (S2405: YES), then processing proceeds to S2406. Next, the sealed data control unit 150 accesses the sealed data for rollback storage area 2200 to determine the existence of sealed data for rollback corresponding to the sealed data for regular use for which it was determined that "data to be rolled back exists" (S2406). In S2406, if it is determined that "no sealed data for rollback exists" (S2406: NO), processing proceeds to S2408, and the sealed data for regular use is updated as described in Embodiment 1. Updating sealed data for regular use in S2408 with the program certificate for rollback received in S2403 is the same as rollback processing and is therefore achieved via the above-described processing flow. If the results of S2406 are that "sealed data for rollback exists" (S2406: YES), then processing proceeds to S2409. Next, the sealed data control unit 150 reads rollback data corresponding to the sealed data for regular use to be rolled back from the sealed data for rollback storage area 2200 (S2409). The sealed data control unit 150 then updates the sealed data for regular use to be rolled back in the storage area for sealed data for regular use 31 using the rollback data read in S2409 (S2410). Subsequently, the sealed data control unit 150 deletes the rollback data read in S2410 from the sealed data for rollback storage area 2200 (S2411). Subsequently, the sealed data control unit 150 deletes the rollback data read in S2410 from the sealed data for rollback storage area 2200 (S2411). The program update control unit 140 updates an old certificate in the certificate storage unit 190 using the program certificate received in S2403 (S2412). Next, the program update control unit 140 updates the program with the program for rollback received in S2404 (S2413).

This concludes the description of Embodiment 2.

3. Other Modifications

While the present invention has been described based on the above Embodiments, the present invention is of course not limited to these Embodiments. The present invention also includes cases such as the following.

(1) In the above Embodiments, a personal computer was described as an example of the information processing terminal 10, but the information processing terminal 10 may be a mobile device such as a cellular phone or PDA. The information processing terminal 10 may also be a stationary electronic appliance, such as a TV, STB or DVD/BD player.

The Internet was described as an example of the network 15, but the network 15 is not limited in this way. The network 15 may be another public network or a cellular phone network. The network 15 may also be wired or wireless, and the type of network is not limited.

(2) In the Embodiments, the signature 905 is generated using the private key in the RSA cryptosystem, which is a public key cryptosystem, but the signature 905 is not limited in this way. For example, an elliptic curve cryptosystem may be used for public key encryption. Also, while not shown in FIG. 4, data fields may be added to the signature 905 to list the name of issuer, algorithm identifier, valid duration, etc. Alternatively, the RIM certificate recited in the TCG Mobile Trusted Module Specification may be used.

(3) In the above Embodiments, the sealed data identifying information 1601 is described as being the authentication information expected value 505 in the sealed data structure shown in FIGS. 5A-5C, but any information that can identify the sealed data may be used.

(4) In the above Embodiments, SHA1 is used as an example of the hash algorithm, but the hash algorithm is not limited in this way. SHA256, SHA384, or SHA512 may be used, as may yet a different algorithm. Instead of a hash algorithm, any algorithm that can generate information uniquely identifying a program may be used.

(5) In the above Embodiments, the expected values for the secure boot completed state 1300 are generated from program certificates for a secure boot, but a program certificate in which the expected values for the secure boot completed state 1300 are set may be stored beforehand in the information processing terminal 10. In this case, the number of register for extension 903 and the extend value 904 are set to NULL in the program certificate in which the expected values for the secure boot completed state 1300 are set. Setting these values to NULL means that when this program certificate is used, an extend operation is not performed on the environment information register 271. Using this certificate allows for omission of the processing in FIG. 13.

(6) In the above Embodiments, the sealed data for use when updating (340, 350, 360) is generated during booting from the sealed data for regular use (310, 320, 340), but the sealed data for use when updating (340, 350, 360) may be stored beforehand in the storage area for sealed data for use when updating 32. In this case, the data obtained by unsealing the sealed data for regular use is updated as necessary and resealed to generate sealed data for use when updating, so that updated data is generated without use of external information.

(7) Detection of a request for unsealing has been described as being achieved by hooking an issued unsealing command, but detection is not limited in this way. Apart from hooking an unsealing command, a command may be inserted to branch processing to the sealed data control unit 150 before a request for an unsealing command from a program targeted for a secure boot.

(8) Sealing in the above Embodiments is performed by encrypting target data for sealing with a public key, along with a condition for unsealing, but sealing need not be limited in this way. Any processing may be adopted that limits access so that target data for sealing is only accessed when the condition for unsealing and the expected value match. For example, target data for sealing may be encrypted with the expected value as the key. Alternatively, the target data for sealing and the expected value in the condition for unsealing may be placed, without encryption, in a tamper-resistant region. The target data for sealing may then be output from the tamper-resistant region only when the expected value in the condition for unsealing and the value of the environment information register in the unsealing environment match.

In Embodiment 1, the program update control unit 140 and the sealed data control unit 150 have not been described as programs targeted for a secure boot, but the program update control unit 140 and the sealed data control unit 150 may of course be programs targeted for a secure boot.

(9) The secure module 20 may be implemented by hardware or by software. More specifically, the secure module 20 may be the TPM or MTM detailed by the TCG In this case, the environment information registers 271 and 272 are Platform Configuration Registers (PCR).

In the above Embodiments, sealing is performed in the secure module 20, but sealing may be performed outside of the secure module 20.

(10) In the above Embodiments, the sealed data control unit 150 determines whether seal updating is necessary (S1801) during processing for seal updating, but the sealed data control unit 150 is not limited in this way. The sealed data control unit 150 may perform seal updating upon receiving notification that updating of sealed data is necessary from a program that uses sealed data in the current stage.

(11) In Embodiment 2, the environment information expected value registers for the secure boot completed state change when a program is rolled back, and therefore sealed data for use when updating also needs to be rolled back. Sealed data for use when updating may be rolled back using the processing flow described in Embodiment 1, or by storing sealed data for use when updating in the sealed data for rollback storage area 2200 and then using this sealed data for rollback, as when rolling back sealed data for regular use in Embodiment 2. This simplifies updating of the sealed data for use when updating.

The sealed data for rollback is deleted from the sealed data for rollback storage area 2200 after rollback is complete, but the sealed data for rollback may instead be stored as is. Furthermore, multiple generations of data for rollback may be stored in the sealed data for rollback storage area 2200. This makes it possible to roll back sealed data for regular use over multiple generations after completion of a secure boot.

(12) In the above Embodiments, data that is targeted for protection by sealing is only information used in booting, but data is not limited in this way. Data may be unsealed during a secure boot and used after the secure boot is complete. For example, IMEI data, which is information unique to cellular phones, may be sealed with environment information for a secure boot in progress, unsealed during the secure boot, and then used after the secure boot is complete.

(13) In the above Embodiments, either the hash value of each program, or the hash value of a character sequence indicating that each program has booted, is calculated. These values are not limited to hash values, however, and any value that changes depending on characteristics of each program or character sequence may be widely used. For example, other information such as a checksum may be used. Alternatively, while precision decreases to some degree, the value of a predetermined number of bits at the start of each program or character sequence may be used.

(14) In the above Embodiments, the target of booting is a program. The target of booting is not limited, however, to a program. For example, the target of booting may be software modules including programs and plug-ins for programs.

(15) Each of the above devices is, specifically, a computer system composed of a microprocessor, ROM, RAM, hard disk unit, display unit, keyboard, mouse, etc. Computer programs are stored on the RAM or the hard disk unit. By operating in accordance with the computer programs, the microprocessor achieves the functions of each device. In order to achieve predetermined functions, the computer programs are composed of a combination of multiple command codes that indicate instructions for the computer. Note that each of the devices is not limited to inclusion of all of the following components: microprocessor, ROM, RAM, hard disk unit, display unit, keyboard, mouse, etc.; each of the devices may include only some of these components.

(16) Part or all of the components comprising each of the above-described devices may be assembled as one system Large Scale Integration (LSI). A system LSI is an ultra-multifunctional LSI produced by integrating multiple components on one chip and, more specifically, is a computer system including a microprocessor, ROM, RAM, and the like. Computer programs are stored in the RAM. The microprocessor operates according to the computer programs, and thereby the system LSI accomplishes its functions.

Individual components comprising each of the above-described devices may respectively be made into discrete chips, or part or all of the components may be made into one chip.

Although referred to here as a system LSI, depending on the degree of integration, the terms IC, LSI, super LSI, or ultra LSI are also used. In addition, the method for assembling integrated circuits is not limited to LSI, and a dedicated communication circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

(17) Part or all of the components comprising each of the above devices may be assembled as an IC card detachable from each device, or as a single module. The IC card/module is a computer system that includes a microprocessor, ROM, RAM, etc. The IC card/module may include therein the above-mentioned ultra-multifunctional LSI. The microprocessor operates according to computer programs, and the IC card/module thereby accomplishes its functions. The IC card/module may be tamper resistant.

(18) The present invention may be the methods described above. The present invention may be computer programs that achieve the method by a computer or may be a digital signal comprising the computer programs.

The present invention may also be a computer-readable recording medium, such as a flexible disk, hard disk, CD-ROM, MO, DVD, DVD-ROM, DVD-RAM, BD (Blu-ray Disc), or semiconductor memory, on which the above-mentioned computer programs or digital signal is recorded. The present invention may also be the digital signal recorded on such a recording medium.

The present invention may also be the computer programs or digital signal to be transmitted via networks, of which telecommunications networks, wire/wireless communications networks, and the Internet are representative, or via data broadcasting.

The present invention may also be a computer system comprising a microprocessor and memory, the memory storing the computer programs, and the microprocessor operating in accordance with the computer programs.

Also, another independent computer system may implement the computer programs or digital signal after the computer programs or digital signal are transferred via being recorded on the recording medium, via one of the above-mentioned networks, etc.

(19) The above Embodiments and Modifications may be combined with one another.

The information processing device according to the present invention is useful in electronic devices such as cellular phones, computers, etc. in which executed programs are updated, and in which it is necessary to perform a secure boot while verifying the integrity of the device as a whole even when the programs are updated. The information processing device according to the present invention is also useful for the production and sale of such electronic devices by manufacturers.

REFERENCE SIGNS LIST 1 information processing system
10 information processing terminal
11 updated program distribution server
12 expected value database
13 program certificate database
14 updated program database
15 network
100 CPU
101 IPL
102 OS loader
103 OS
104 application
110 RAM
120 ROM
130 program storage unit
140 program update control unit
150 sealed data control unit
160 sealed data dependency list storage unit
170 sealed data storage unit
180 sealed key storage unit
190 certificate storage unit
20 secure module
210 command I/O
220 verification unit
230 measurement unit
240 encryption unit
250 sealing unit
270 environment information storage unit
271, 272, 1201, 1202, 1203 environment information register
31 storage area for sealed data for regular use
32 storage area for sealed data for use when updating
310, 320, 330 sealed data for regular use
340, 350, 360 sealed data for use when updating
400 root key pair
401 root private key
402 root public key
410, 420, 430 sealed data key pair
411, 421, 431 sealed data public key
412, 422, 432 sealed data private key
501, 1511, 1521 environment information size
502, 902, 1512, 1522 expected value
503, 1513, 1523 size of the target data for sealing
504, 1514, 1524 target data for sealing
505, 1515, 1525 authentication information expected value
901 certificate identifier
903 number of register for extending
904 extend value
905 signature
1010, 1011 IPL certificate
1020, 1021 OS loader certificate
1030, 1031 OS certificate
1300 expected values for the secure boot completed state
1600 sealed data dependency list
1601 sealed data identifying information
1602 certificate identifying information
2200 sealed data for rollback storage area
2210, 2220, 2230 sealed data for rollback

The invention claimed is:

1. An information processing device for performing a secure boot by booting a plurality of programs in a predetermined order while verifying integrity of each program, the information processing device comprising:
an execution unit operable to execute the programs;
an accumulation unit operable to generate, each time a program is booted, characteristic information on the program that has been booted, to accumulate the characteristic information as a cumulative value, and to store the cumulative value;
a storage unit for storing first protected data and second protected data, the first protected data including boot data that is used by a specific program during booting and an expected value of the cumulative value stored by the accumulation unit immediately before the specific program is booted, and the second protected data including the boot data and an expected value of the cumulative value stored by the accumulation unit after the secure boot;
a protection removal unit operable, upon updating, after the secure boot, of a program that is booted before the specific program, to remove protection from the second protected data, to determine whether the expected value in the second protected data matches the cumulative value stored by the accumulation unit after the secure boot, and to output the boot data only when the expected value and the cumulative value match; and
a reprotection unit operable, when the protection removal unit outputs the boot data, to reprotect the first protected data so as to include the boot data and an expected value of the cumulative value stored by the accumulation unit immediately before the specific program is booted after the updating,
wherein the reprotection unit is further operable, when the protection removal unit outputs the boot data, to reprotect the second protected data to include the boot data and an expected value of the post-updating cumulative value stored by the accumulation unit after the updating and after the secure boot,
the protection removal unit is further operable, when the execution unit issues a request to acquire the boot data during execution of the specific program, to remove protection from the first protected data, to determine whether the expected value in the first protected data matches the cumulative value stored by the accumulation unit, and to output the boot data to the execution unit only when the expected value and the cumulative value match, and
the protection removal unit is further operable to receive an instruction for protection removal, to remove protection from the first protected data, to determine whether the expected value in the first protected data matches the cumulative value stored by the accumulation unit, and to output the boot data only when the expected value and the cumulative value match, and
wherein the information processing device further comprises:

a management information generation unit operable, each time a program is booted, to output the instruction for protection removal to the protection removal unit, and when the protection removal unit outputs the boot data, to generate management information designating the program that has been booted as the specific program and associating the specific program with the first protected data; and a management information storage unit for storing the management information, and each time a program is booted after the management information unit has stored the management information, the execution unit determines whether the program that has been booted is the specific program in accordance with the management information.

2. The information processing device of claim 1, wherein the first protected data and the second protected data are protected by encryption, the protection removal unit decrypts the second protected data to remove protection from the second protected data, and the reprotection unit reprotects the first protected data by encrypting the boot data and an expected value of the cumulative value stored by the accumulation unit immediately before the specific program is booted after the updating.

3. The information processing device of claim 1, wherein the characteristic information is a hash value of the program that is booted.

4. The information processing device of claim 1, wherein the characteristic information is state information indicating a state in which the program is booted normally.

5. The information processing device of claim 4, wherein the state information is a hash value of a character sequence indicating that the program has booted.

6. The information processing device of claim 1, wherein the reprotection unit is further operable to back up the first protected data in the storage unit before reprotection, yielding backup first protected data, and the information processing device further comprises:

a rollback unit operable, when instructed to restore an updated program to a state before updating, to replace reprotected first protected data with the backup first protected data.

7. An information processing method used in an information processing device for performing a secure boot by booting a plurality of programs in a predetermined order while verifying integrity of each program, the information processing device including:

an execution unit operable to execute the programs;

an accumulation unit operable to generate, each time a program is booted, characteristic information on the program that has been booted, to accumulate the characteristic information as a cumulative value, and to store the cumulative value; and a storage unit for storing first protected data and second protected data, the first protected data including boot data that is used by a specific program during booting and an expected value of the cumulative value stored by the accumulation unit immediately before the specific program is booted, and the second protected data including the boot data and an expected value of the cumulative value stored by the accumulation unit after the secure boot, the information processing method comprising the steps of:

removing protection from the second protected data upon updating, after the secure boot, of a program that is booted before the specific program, determining whether the expected value in the second protected data matches the cumulative value stored by the accumulation unit after the secure boot, and outputting the boot data only when the expected value and the cumulative value match; and reprotecting, when the protection removal unit outputs the boot data, the first protected data so as to include the boot data and an expected value of the cumulative value stored by the accumulation unit immediately before the specific program is booted after the updating, wherein in the reprotection step, when the protection removal step outputs the boot data, the reprotection step reprotects the second protected data to include the boot data and an expected value of the post-updating cumulative value stored by the accumulation unit after the updating and after the secure boot, in protection removal step, when the execution unit issues a request to acquire the boot data during execution of the specific program, the protection removal step removes protection from the first protected data, determines whether the expected value in the first protected data matches the cumulative value stored by the accumulation unit, and outputs the boot data to the execution unit only when the expected value and the cumulative value match, and the protection removal step further receives an instruction for protection removal, removes protection from the first protected data, determines whether the expected value in the first protected data matches the cumulative value stored by the accumulation unit, and outputs the boot data only when the expected value and the cumulative value match, and wherein the information processing method further comprises:

a management information generation step for, each time a program is booted, outputting the instruction for protection removal to the protection removal step, and when the protection removal step outputs the boot data, generating management information designating the program that has been booted as the specific program and associating the specific program with the first protected data; and a management information storage step for storing the management information, and each time a program is booted after the management information step has stored the management information, the execution unit determines whether the program that has been booted is the specific program in accordance with the management information.

8. An information processing program used in an information processing device for performing a secure boot by booting a plurality of programs in a predetermined order while verifying integrity of each program, the information processing device including:

an execution unit operable to execute the programs;

an accumulation unit operable to generate, each time a program is booted, characteristic information on the program that has been booted, to accumulate the characteristic information as a cumulative value, and to store the cumulative value; and a storage unit for storing first protected data and second protected data, the first protected data including boot data that is used by a specific program during booting and an expected value of the cumulative value stored by the accumulation unit immediately before the specific program is booted, and the second protected data including the boot data and an expected value of the cumulative value stored by the accumulation unit after the secure boot, the information processing program causing a computer to perform the steps of:

removing protection from the second protected data upon updating, after the secure boot, of a program that is booted before the specific program, determining whether the expected value in the second protected data matches the cumulative value stored by the accumulation unit after the secure boot, and outputting the boot data only when the expected value and the cumulative value match; and reprotecting, when the protection removal unit outputs the boot data, the first protected data so as to include the boot data and an expected value of the cumulative value stored by the accumulation unit immediately before the specific program is booted after the updating, wherein in the reprotection step, when the protection removal step outputs the boot data, the reprotection step reprotects the second protected data to include the boot data and an expected value of the post-updating cumulative value stored by the accumulation unit after the updating and after the secure boot, in protection removal step, when the execution unit issues a request to acquire the boot data during execution of the specific program, the protection removal step removes protection from the first protected data, determines whether the expected value in the first protected data matches the cumulative value stored by the accumulation unit, and outputs the boot data to the execution unit only when the expected value and the cumulative value match, and the protection removal step further receives an instruction for protection removal, removes protection from the first protected data, determines whether the expected value in the first protected data matches the cumulative value stored by the accumulation unit, and outputs the boot data only when the expected value and the cumulative value match, and wherein the information processing program causes the computer to execute further steps comprising:

a management information generation step for, each time a program is booted, outputting the instruction for protection removal to the protection removal step, and when the protection removal step outputs the boot data, generating management information designating the program that has been booted as the specific program and associating the specific program with the first protected data; and a management information storage step for storing the management information, and each time a program is booted after the management information step has stored the management information, the execution unit determines whether the program that has been booted is the specific program in accordance with the management information.

9. A non-transitory computer readable recording medium storing thereon an information processing program used in an information processing device for performing a secure boot by booting a plurality of programs in a predetermined order while verifying integrity of each program, the information processing device including:

an execution unit operable to execute the programs;

an accumulation unit operable to generate, each time a program is booted, characteristic information on the program that has been booted, to accumulate the characteristic information as a cumulative value, and to store the cumulative value; and a storage unit for storing first protected data and second protected data, the first protected data including boot data that is used by a specific program during booting and an expected value of the cumulative value stored by the accumulation unit immediately before the specific program is booted, and the second protected data including the boot data and an expected value of the cumulative value stored by the accumulation unit after the secure boot, the information processing program causing a computer to perform the steps of:

removing protection from the second protected data upon updating, after the secure boot, of a program that is booted before the specific program, determining whether the expected value in the second protected data matches the cumulative value stored by the accumulation unit after the secure boot, and outputting the boot data only when the expected value and the cumulative value match; and reprotecting, when the protection removal unit outputs the boot data, the first protected data so as to include the boot data and an expected value of the cumulative value stored by the accumulation unit immediately before the specific program is booted after the updating, wherein in the reprotection step, when the protection removal step outputs the boot data, the reprotection step reprotects the second protected data to include the boot data and an expected value of the post-updating cumulative value stored by the accumulation unit after the updating and after the secure boot, in protection removal step, when the execution unit issues a request to acquire the boot data during execution of the specific program, the protection removal step removes protection from the first protected data, determines whether the expected value in the first protected data matches the cumulative value stored by the accumulation unit, and outputs the boot data to the execution unit only when the expected value and the cumulative value match, and the protection removal step further receives an instruction for protection removal, removes protection from the first protected data, determines whether the expected value in the first protected data matches the cumulative value stored by the accumulation unit, and outputs the boot data only when the expected value and the cumulative value match, and wherein the information processing program causes the computer to execute further steps comprising:

a management information generation step for, each time a program is booted, outputting the instruction for protection removal to the protection removal step, and when the protection removal step outputs the boot data, generating management information designating the program that has been booted as the specific program and associating the specific program with the first protected data; and a management information storage step for storing the management information, and each time a program is booted after the management information step has stored the management information, the execution unit determines whether the program that has been booted is the specific program in accordance with the management information.

10. An integrated circuit used in an information processing device for performing a secure boot by booting a plurality of programs in a predetermined order while verifying integrity of each program, the information processing device comprising:

an execution unit operable to execute the programs;

an accumulation unit operable to generate, each time a program is booted, characteristic information on the program that has been booted, to accumulate the characteristic information as a cumulative value, and to store the cumulative value;

a storage unit for storing first protected data and second protected data, the first protected data including boot data that is used by a specific program during booting and an expected value of the cumulative value stored by the accumulation unit immediately before the specific program is booted, and the second protected data including the boot data and an expected value of the cumulative value stored by the accumulation unit after the secure boot;

a protection removal unit operable, upon updating, after the secure boot, of a program that is booted before the specific program, to remove protection from the second protected data, to determine whether the expected value in the second protected data matches the cumulative value stored by the accumulation unit after the secure boot, and to output the boot data only when the expected value and the cumulative value match; and a reprotection unit operable, when the protection removal unit outputs the boot data, to reprotect the first protected data so as to include the boot data and an expected value of the cumulative value stored by the accumulation unit immediately before the specific program is booted after the updating, wherein the reprotection unit is further operable, when the protection removal unit outputs the boot data, to reprotect the second protected data to include the boot data and an expected value of the post-updating cumulative value stored by the accumulation unit after the updating and after the secure boot, the protection removal unit is further operable, when the execution unit issues a request to acquire the boot data during execution of the specific program, to remove protection from the first protected data, to determine whether the expected value in the first protected data matches the cumulative value stored by the accumulation unit, and to output the boot data to the execution unit only when the expected value and the cumulative value match, and the protection removal unit is further operable to receive an instruction for protection removal, to remove protection from the first protected data, to determine whether the expected value in the first protected data matches the cumulative value stored by the accumulation unit, and to output the boot data only when the expected value and the cumulative value match, and wherein the integrated circuit further comprises:

a management information generation unit operable, each time a program is booted, to output the instruction for protection removal to the protection removal unit, and when the protection removal unit outputs the boot data, to generate management information designating the program that has been booted as the specific program and associating the specific program with the first protected data; and a management information storage unit for storing the management information, and each time a program is booted after the management information unit has stored the management information, the execution unit determines whether the program that has been booted is the specific program in accordance with the management information.

\* \* \* \* \*